(12) United States Patent
Tokunaga

(10) Patent No.: US 11,847,362 B2
(45) Date of Patent: Dec. 19, 2023

(54) SERVER, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Narumi Tokunaga, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/101,193

(22) Filed: Jan. 25, 2023

(65) Prior Publication Data

US 2023/0266929 A1    Aug. 24, 2023

(30) Foreign Application Priority Data

Feb. 18, 2022    (JP) ................. 2022-024021

(51) Int. Cl.
  *G06F 3/12*    (2006.01)
  *G06K 15/02*    (2006.01)

(52) U.S. Cl.
  CPC ............ *G06F 3/1213* (2013.01); *G06F 3/121* (2013.01); *G06F 3/1234* (2013.01); *G06F 3/1267* (2013.01); *G06F 3/1272* (2013.01); *G06F 3/1274* (2013.01); *G06F 3/1287* (2013.01)

(58) Field of Classification Search
  None
  See application file for complete search history.

(56) References Cited

FOREIGN PATENT DOCUMENTS

| JP | 2012203430 | * | 10/2012 | ............ G06F 13/00 |
| JP | 2014010769 | * | 1/2014 | ......... H04L 63/0884 |
| JP | 2016-184415 A | | 10/2016 | |
| JP | 2018106263 | * | 7/2018 | ............... G06F 3/12 |

* cited by examiner

*Primary Examiner* — Beniyam Menberu
(74) *Attorney, Agent, or Firm* — VENABLE LLP

(57) ABSTRACT

In a cloud mediation service, a server includes an acquisition unit to acquire a first storage period for storing, in a first cloud service, a first job submitted to the first cloud service, and a second storage period for storing, in a second cloud service, a second job submitted to the second cloud service, and an execution unit to execute, based on one of a first timing at which the first job is deleted due to an elapse of the first storage period and a second timing at which the second job is deleted due to an elapse of the second storage period, a cooperation process of making a period for storing the first job in the first cloud service and a period for storing the second job in the second cloud service cooperate with each other.

15 Claims, 22 Drawing Sheets

FIG. 5

PRINTING APPARATUS INFORMATION TABLE ~ 151

- CLOUD PRINTING SERVICE PRINTER ID ~ 154
- PRINTING APPARATUS SUPPORTING CLOUD PRINTING SERVICE PRINTER ID ~ 155
- CLOUD PRINTING SERVICE TYPE ~ 156
- TENANT ~ 157
- PRINTING APPARATUS NAME ~ 158
- PRINTING APPARATUS MODEL NAME ~ 159
- ACCESS TOKEN ~ 160
- :

PRINT JOB INFORMATION TABLE ~ 152

- CLOUD PRINTING SERVICE JOB ID ~ 161
- CLOUD PRINTING SERVICE PRINTER ID
- PRINTING APPARATUS SUPPORTING CLOUD PRINTING SERVICE PRINTER ID
- CLOUD PRINTING SERVICE TYPE
- TENANT
- USER ~ 162
- PRINT JOB NAME ~ 163
- PRINT JOB STATUS ~ 164
- PRINT DATA ID ~ 165
- PRINTING SETTING ~ 166
- PRINT DATA URL ~ 167
- PRINT JOB ACCEPTANCE TIME ~ 168
- PRINT JOB TRANSMISSION STATE ~ 169
- PRINT DATA DOWNLOAD STATE ~ 170
- PRINT JOB IDENTIFICATION NAME ~ 171
- PRINT JOB TRANSMISSION TIME ~ 172
- :

SERVICE SETTING TABLE ~ 153

- CLOUD PRINTING SERVICE JOB STORAGE PERIOD ~ 173
- PRINTING APPARATUS SUPPORTING CLOUD PRINTING SERVICE JOB STORAGE PERIOD ~ 174
- :

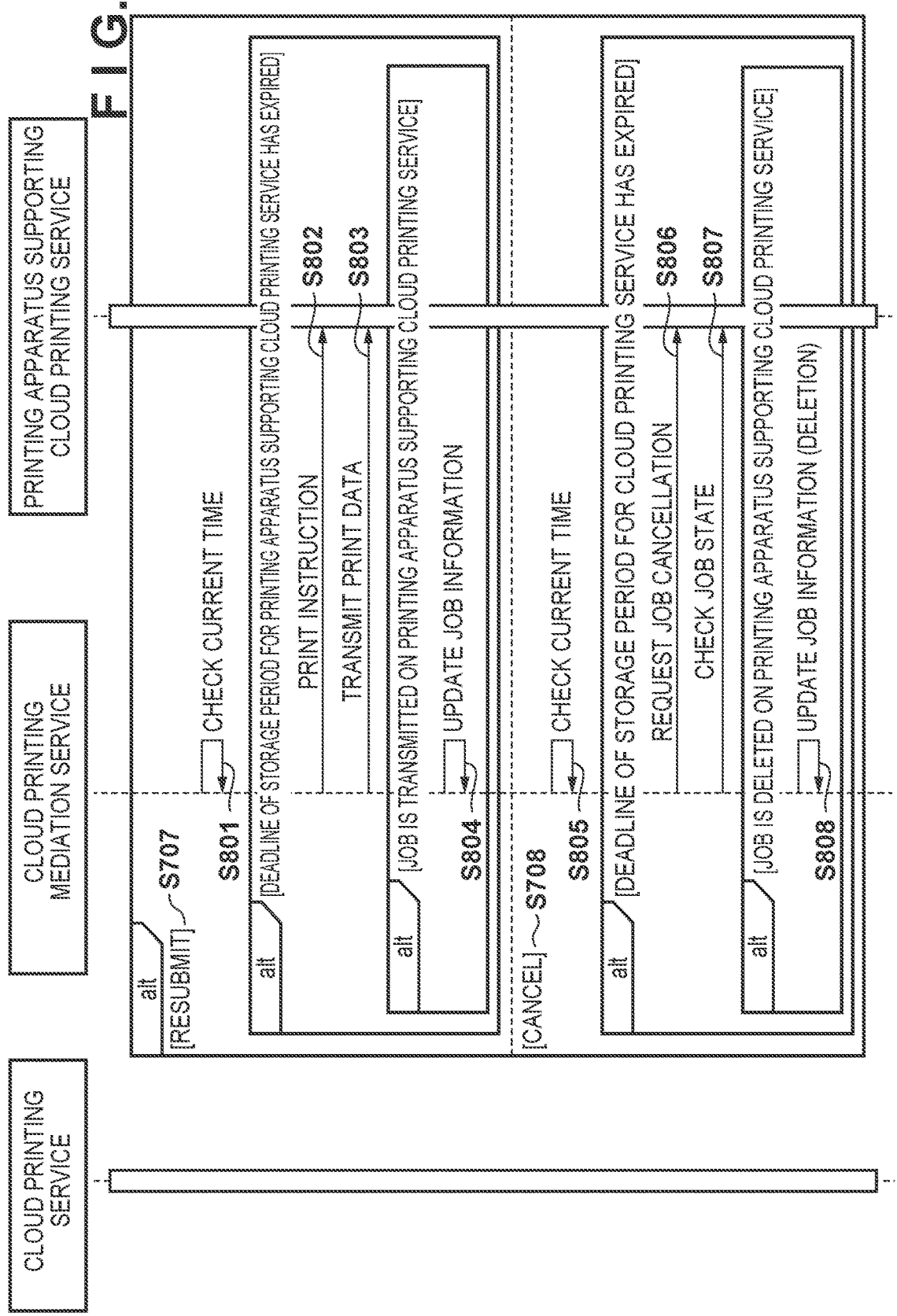

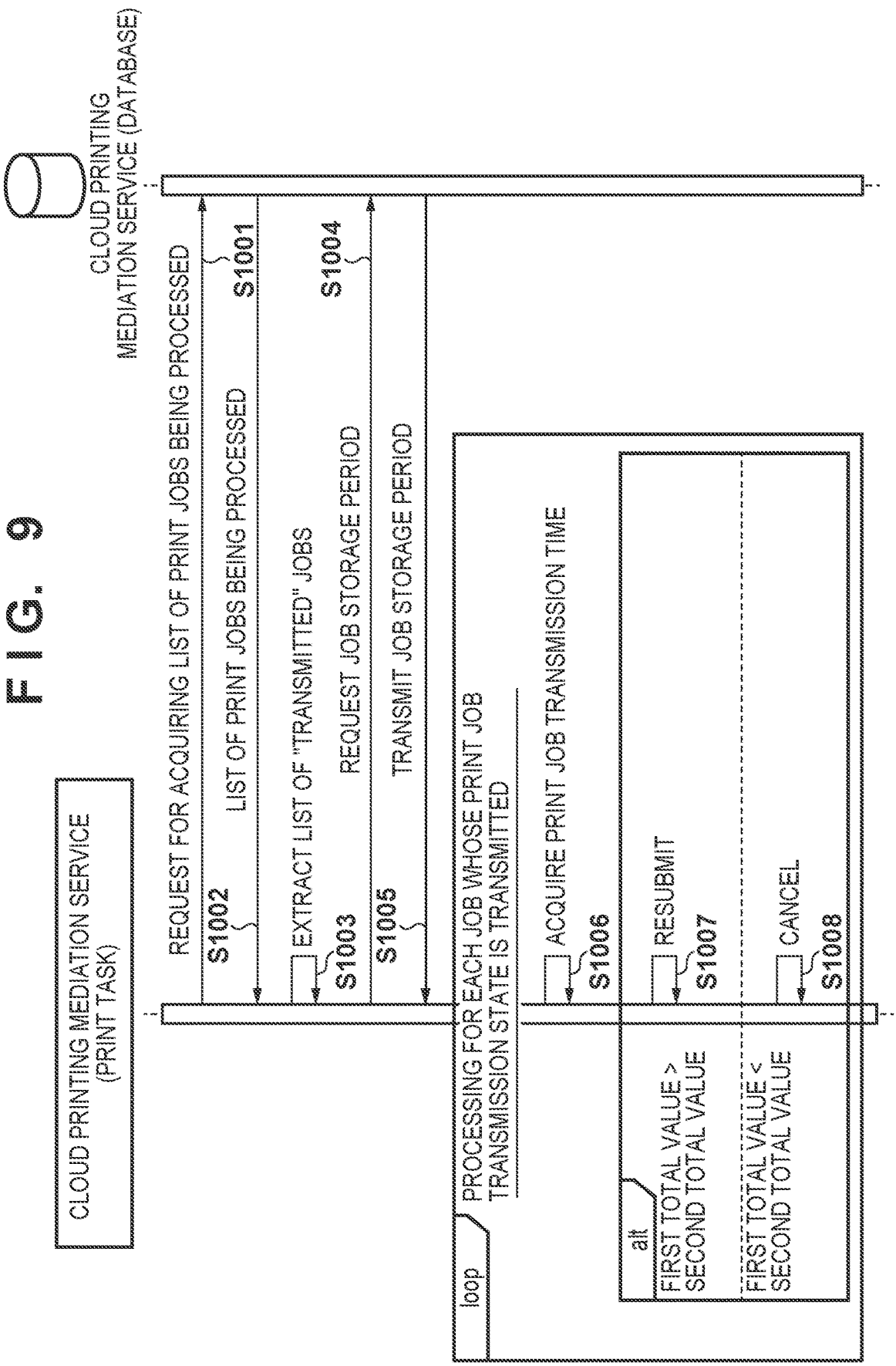

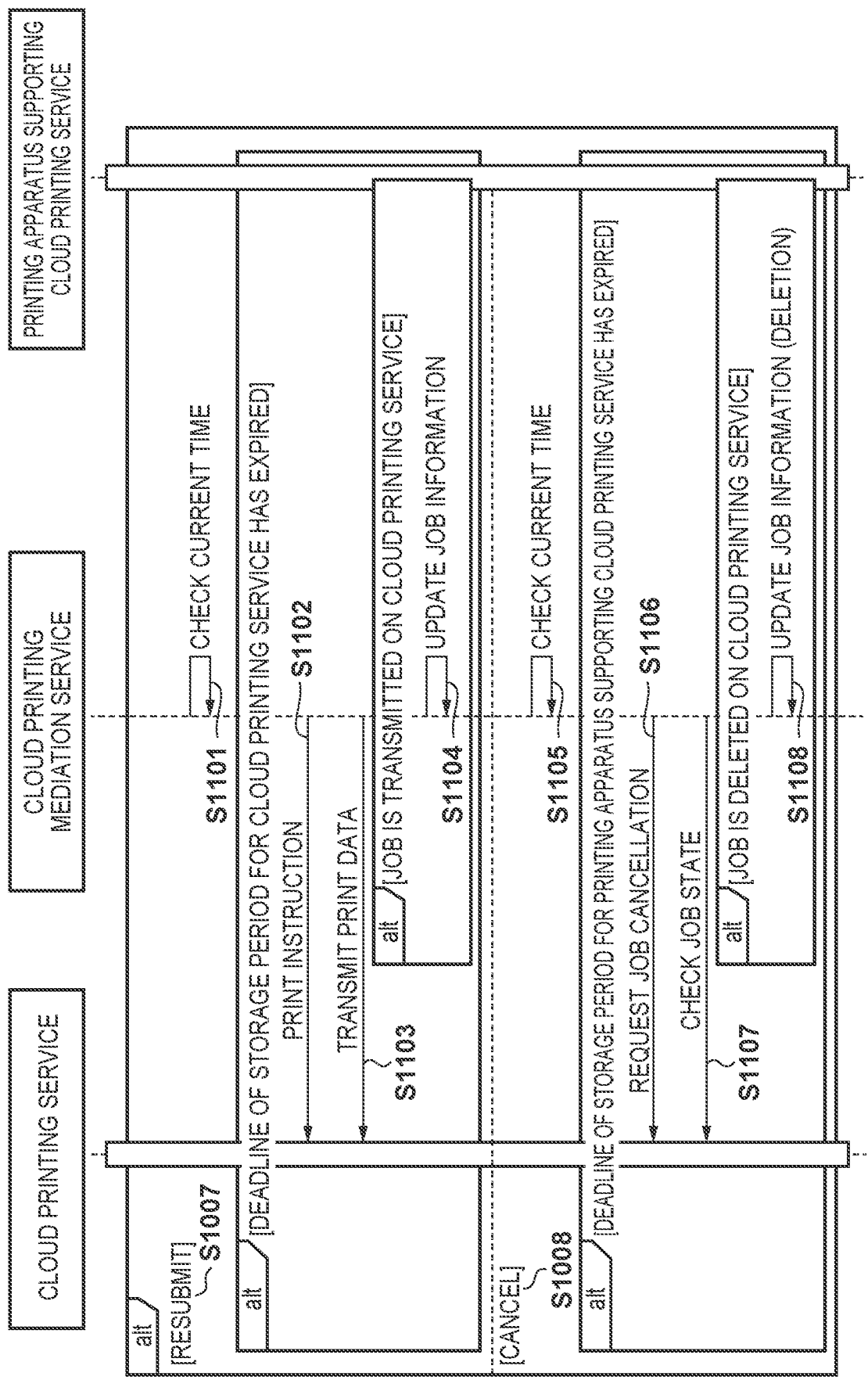

FIG. 11

PRINT JOB INFORMATION TABLE ~1202
- CLOUD PRINTING SERVICE JOB ID ~1211
- CLOUD PRINTING SERVICE PRINTER ID
- PRINTING APPARATUS SUPPORTING CLOUD PRINTING SERVICE PRINTER ID
- CLOUD PRINTING SERVICE TYPE
- TENANT
- USER ~1212
- PRINT JOB NAME ~1213
- PRINT JOB STATUS ~1214
- PRINT DATA ID ~1215
- PRINTING SETTING ~1216
- PRINT DATA URL ~1217
- PRINT JOB ACCEPTANCE TIME ~1218
- PRINT JOB TRANSMISSION STATE ~1219
- PRINT DATA DOWNLOAD STATE ~1210
- PRINT JOB IDENTIFICATION NAME ~1221
- PRINT JOB TRANSMISSION TIME ~1222
- PRINTING COMPLETION ESTIMATED TIME ~1223

PRINTING APPARATUS INFORMATION TABLE ~1201
- CLOUD PRINTING SERVICE PRINTER ID ~1204
- PRINTING APPARATUS SUPPORTING CLOUD PRINTING SERVICE PRINTER ID ~1205
- CLOUD PRINTING SERVICE TYPE ~1206
- TENANT ~1207
- PRINTING APPARATUS NAME ~1208
- PRINTING APPARATUS MODEL NAME ~1209
- ACCESS TOKEN ~1210
- :

SERVICE SETTING TABLE ~1203
- CLOUD PRINTING SERVICE JOB STORAGE PERIOD ~1224
- PRINTING APPARATUS SUPPORTING CLOUD PRINTING SERVICE JOB STORAGE PERIOD ~1225
- :

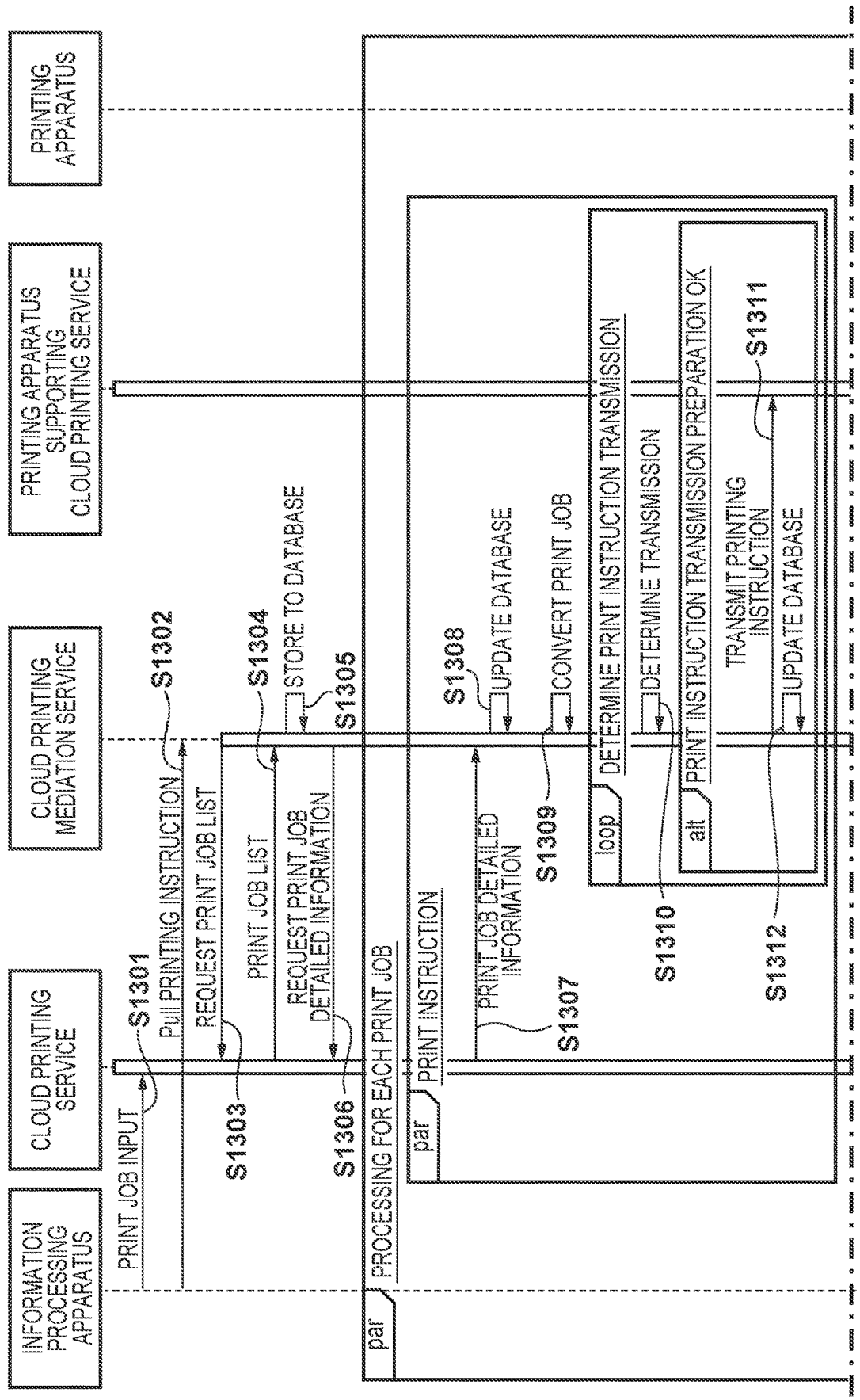

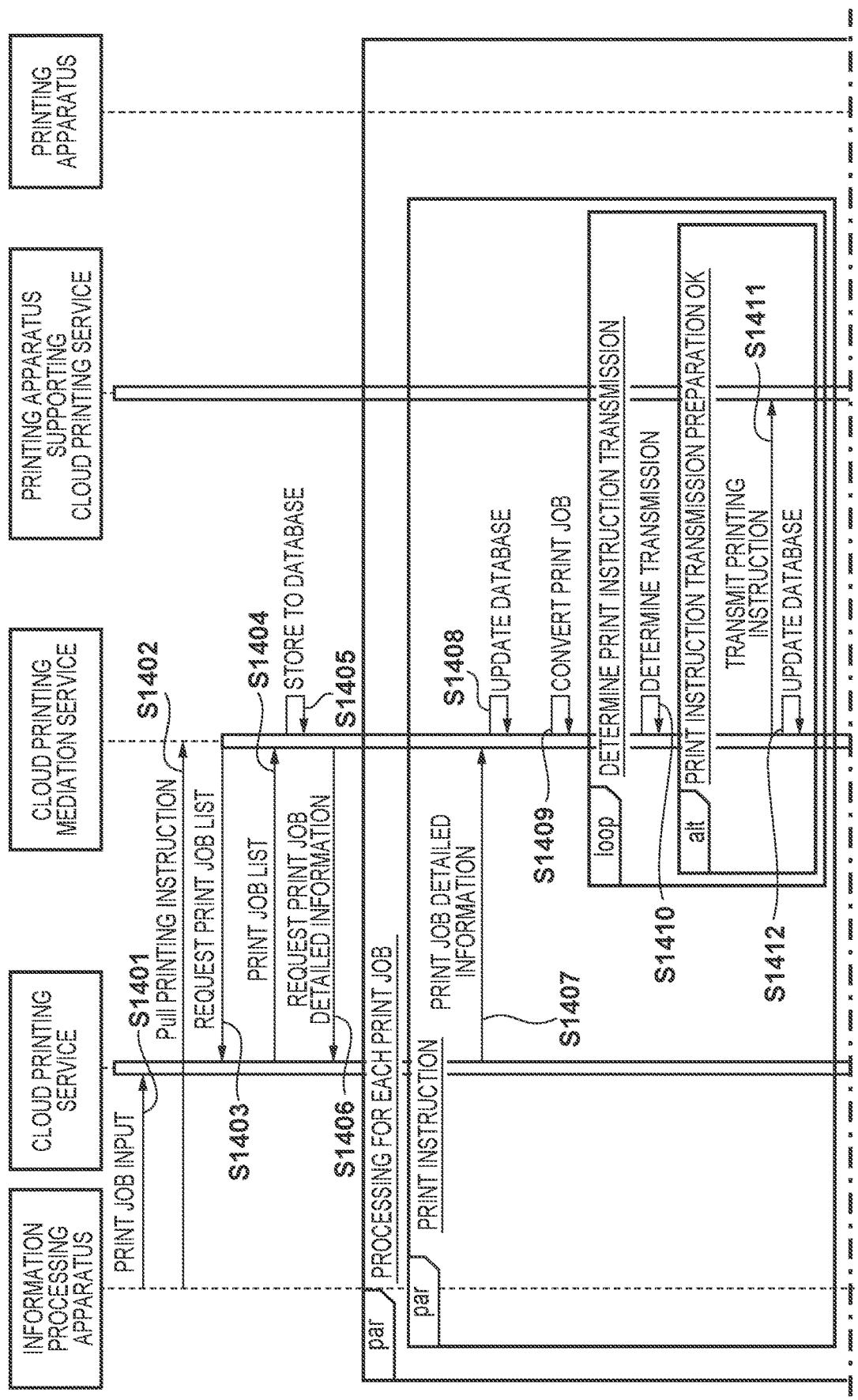

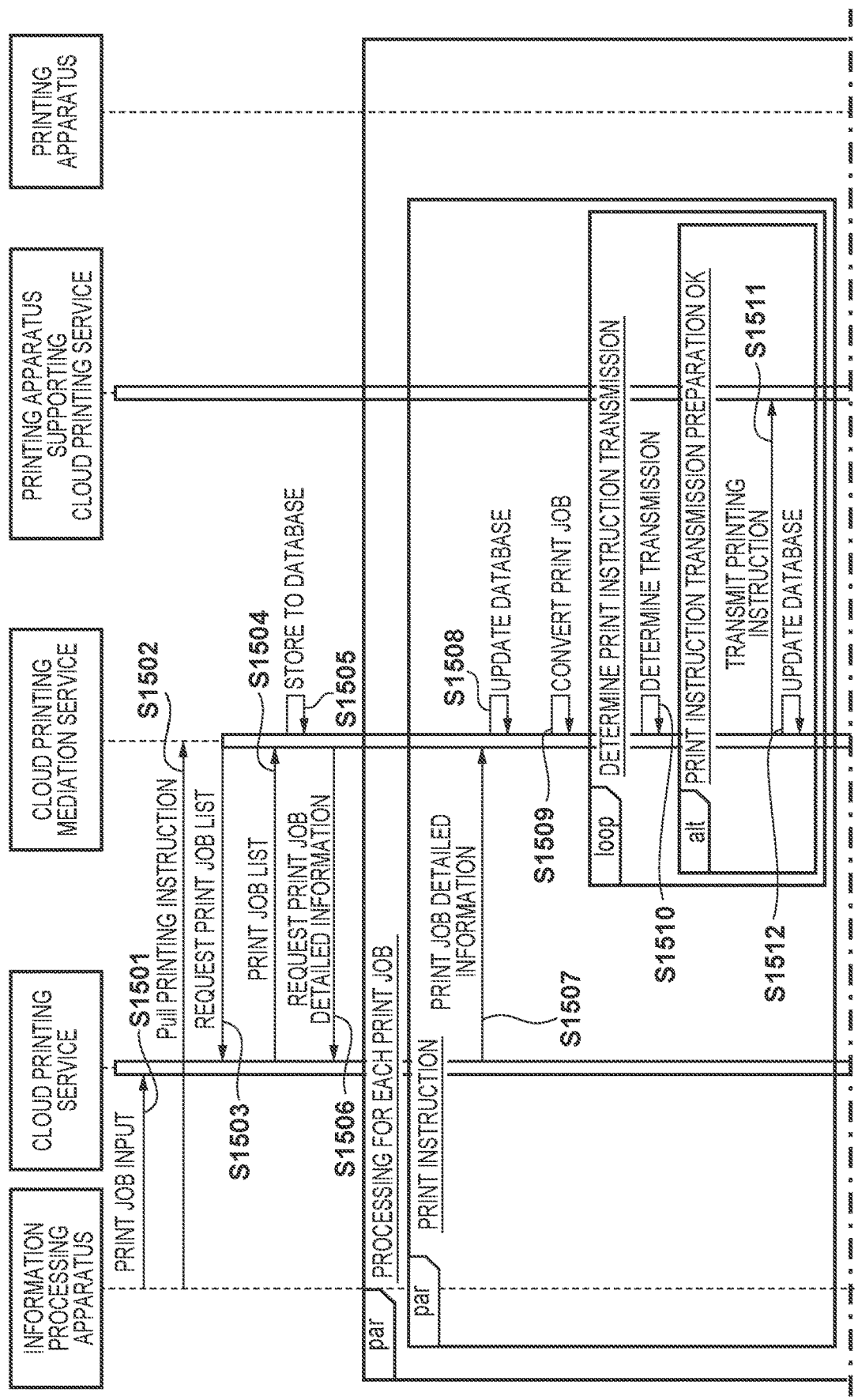

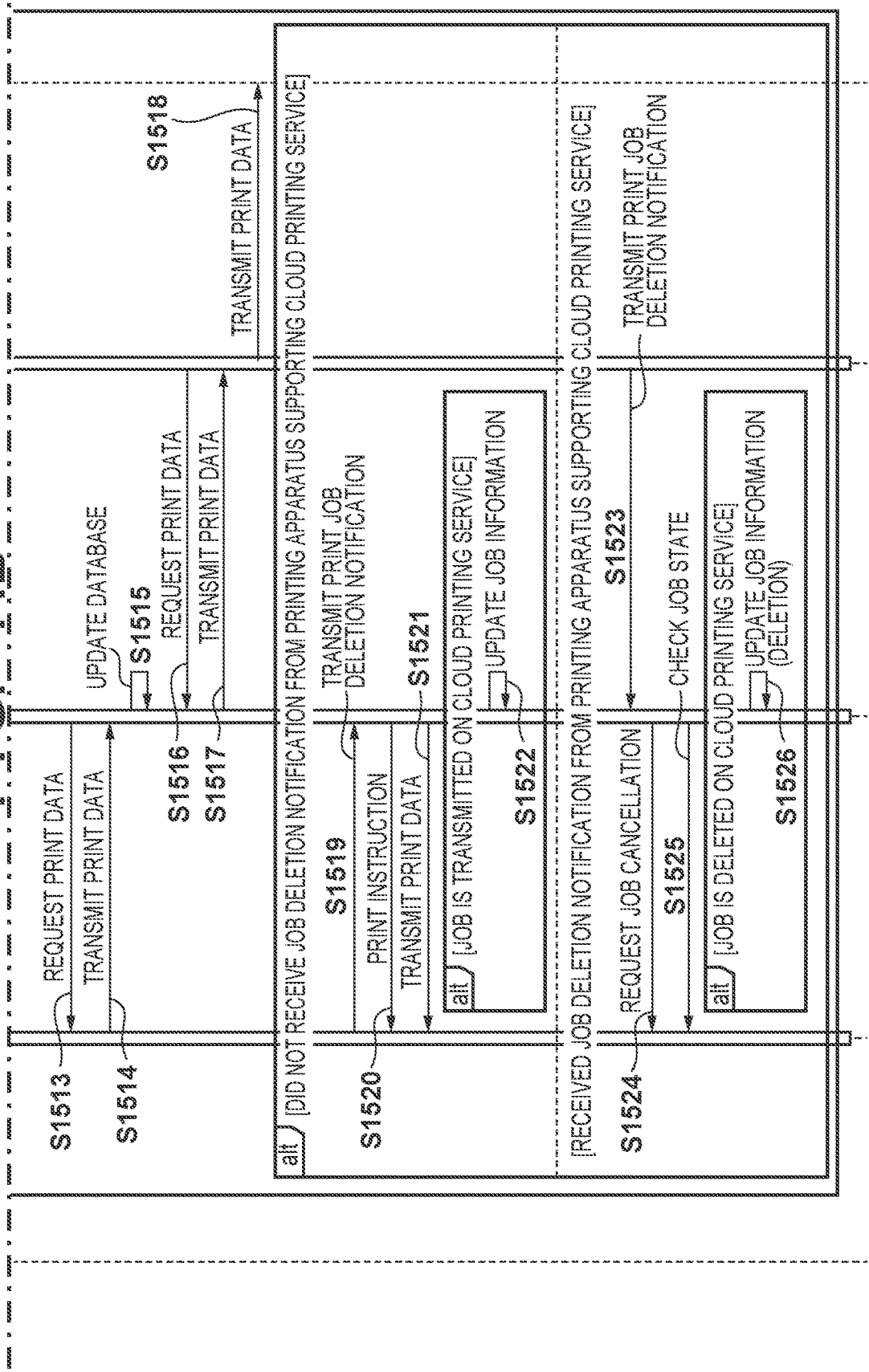

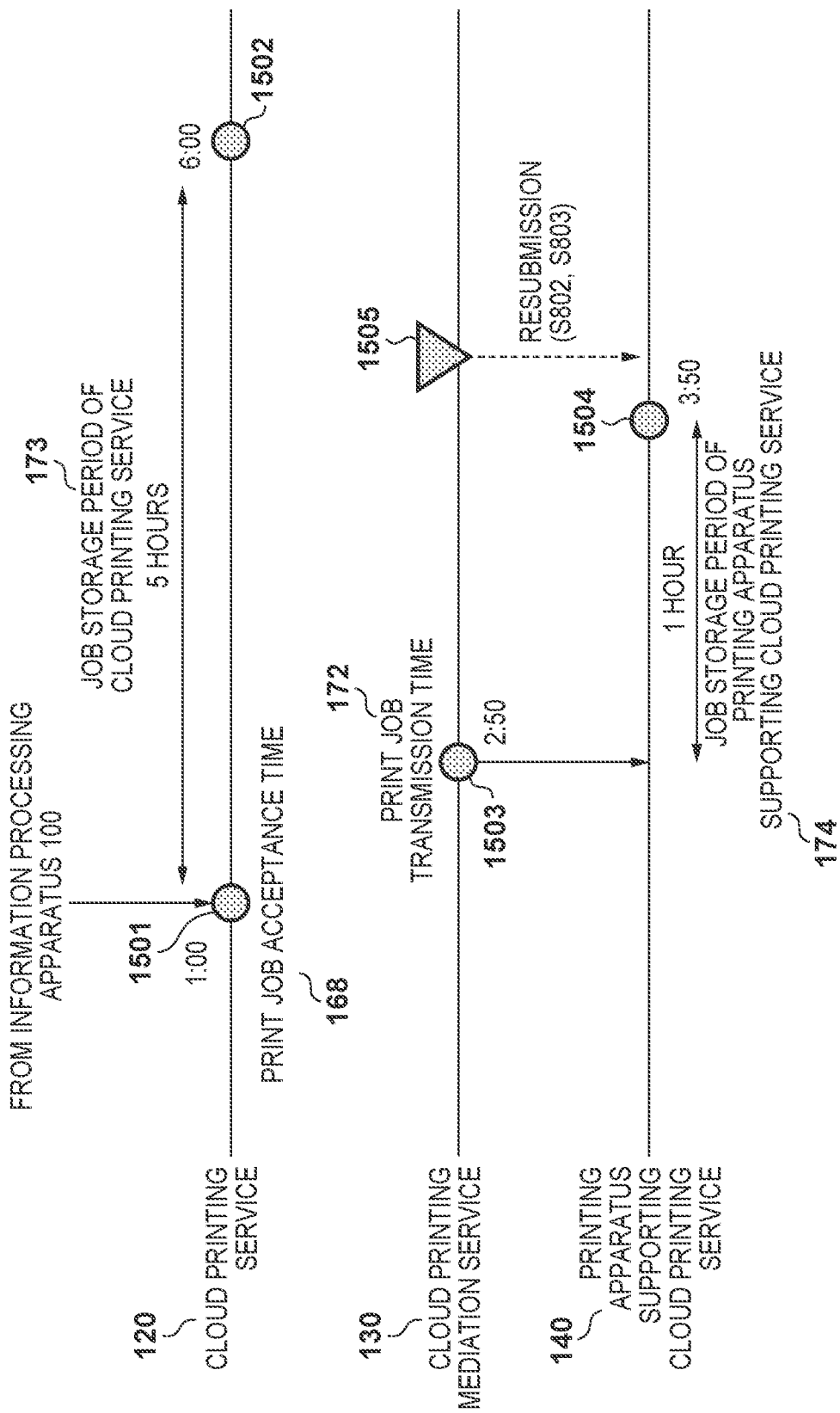

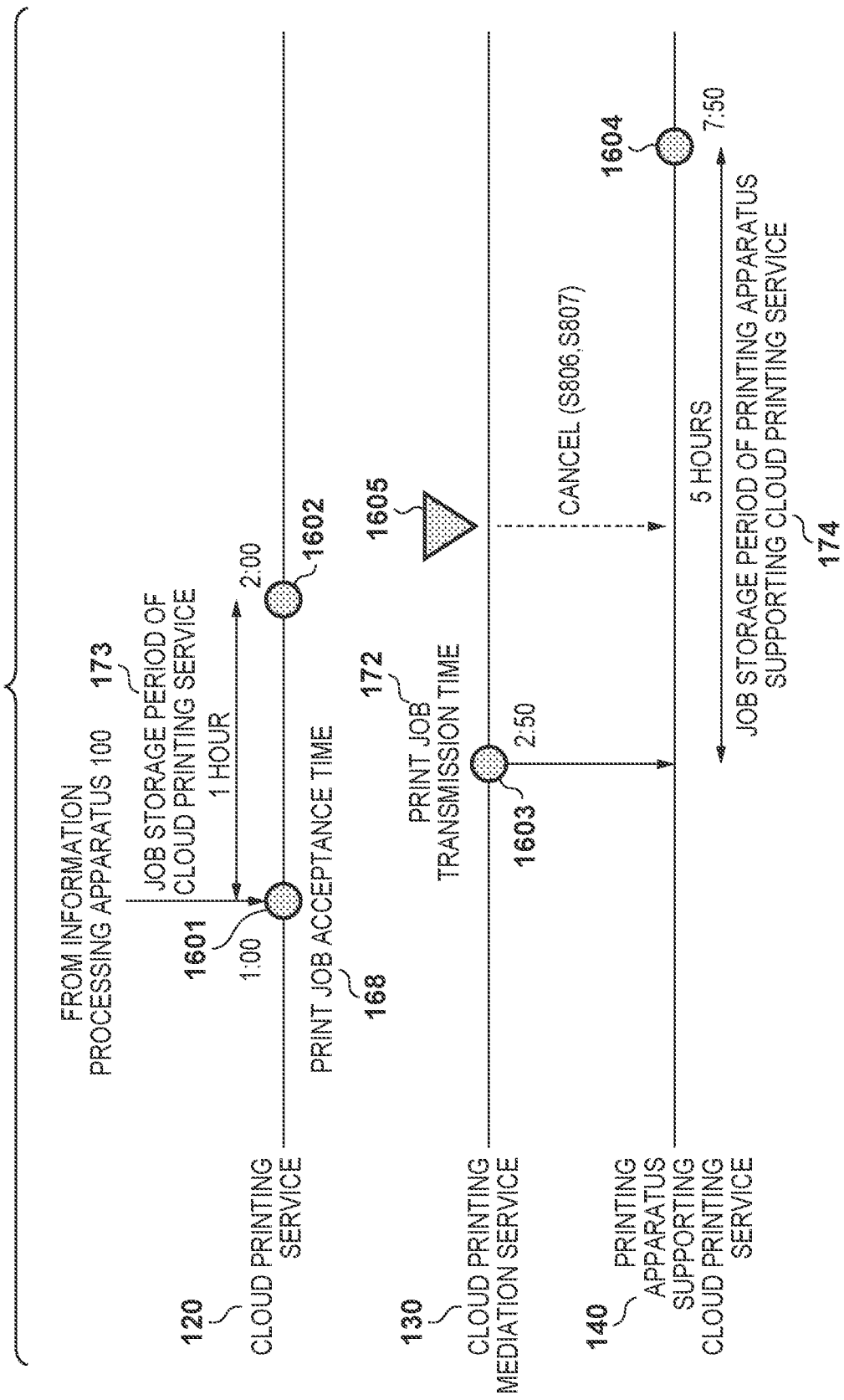

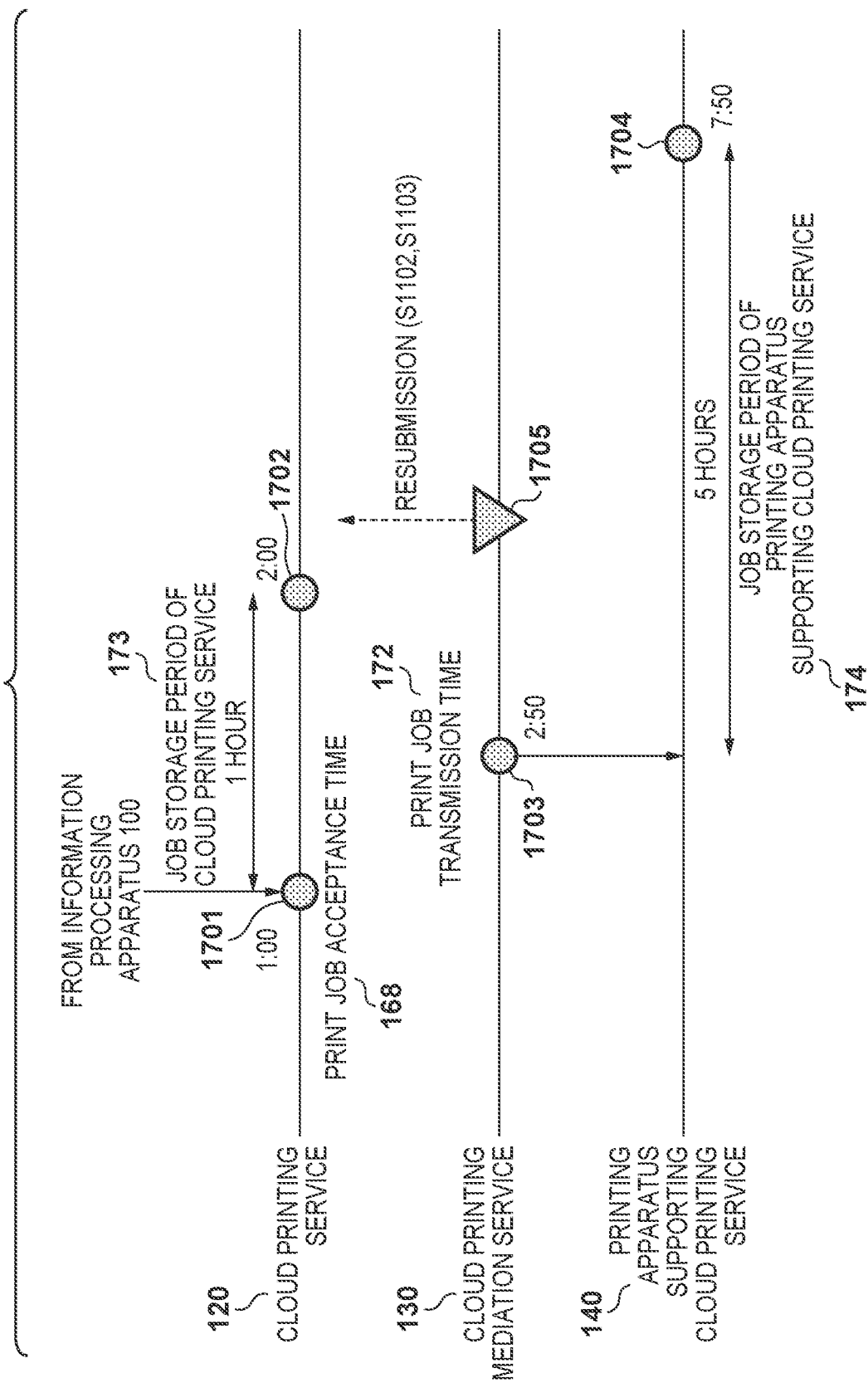

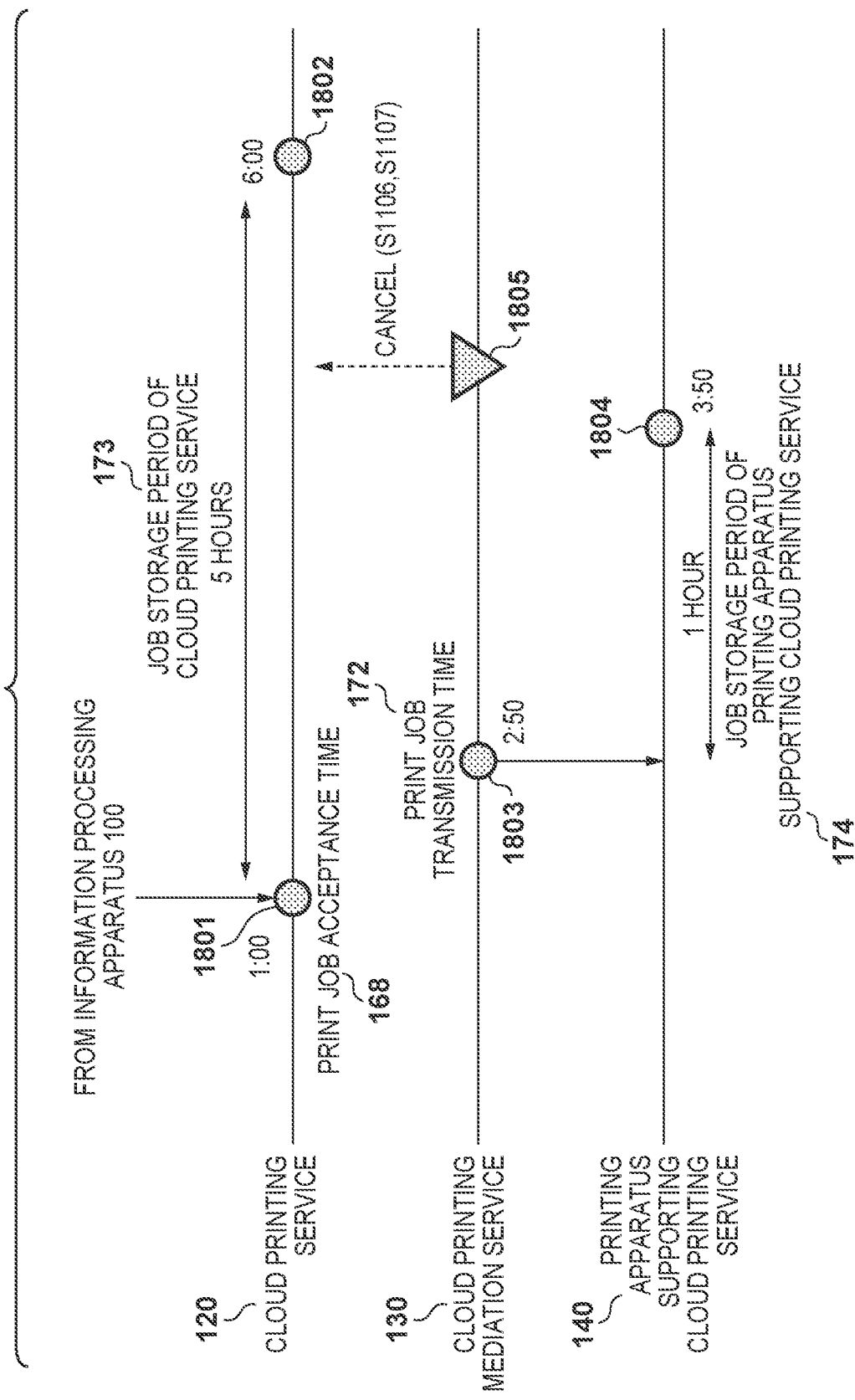

000
SERVER, METHOD, AND NON-TRANSITORY COMPUTER-READABLE STORAGE MEDIUM STORING PROGRAM

BACKGROUND OF THE INVENTION

Field of the Invention

The present invention relates to a server that can provide a cloud service cooperating with a plurality of cloud services, a method, and a non-transitory computer-readable storage medium storing a program.

Description of the Related Art

There is known a cloud printing service that executes printing via a cloud. In the cloud printing service, when an information processing apparatus such as a personal computer (to be referred to as a "PC" hereinafter) issues a print request to the cloud printing service configured on the cloud, the print request is transmitted to a printing apparatus associated on the cloud printing service. Such the cloud printing service includes a database for managing a printing state, and is configured to store the print request information until printing is complete.

SUMMARY OF THE INVENTION

The present invention provides a server that makes job storage periods cooperate between cloud services, a method, and a non-transitory computer-readable storage medium storing a program.

The present invention in one aspect provides a server that can provide a cloud mediation service capable of cooperating with a plurality of cloud services, wherein the plurality of cloud services include a first cloud service to which a job is submitted, and a second cloud service that executes an output process corresponding to the job, in the cloud mediation service, the server comprises a submission unit configured to submit a first job submitted to the first cloud service to the second cloud service as a second job, an acquisition unit configured to acquire a first storage period for storing, in the first cloud service, the first job submitted to the first cloud service, and a second storage period for storing, in the second cloud service, the second job submitted to the second cloud service, and an execution unit configured to execute, based on one of a first timing at which the first job is deleted due to an elapse of the first storage period and a second timing at which the second job is deleted due to an elapse of the second storage period, a cooperation process of making a period for storing the first job in the first cloud service and a period for storing the second job in the second cloud service cooperate with each other, and the cooperation process includes a process of restarting storage for one of the first storage period and the second storage period, and a process of interrupting storage for one of the first storage period and the second storage period.

According to the present invention, it is possible to make job storage periods cooperate between cloud services.

Further features of the present invention will become apparent from the following description of exemplary embodiments with reference to the attached drawings.

BRIEF DESCRIPTION OF THE DRAWINGS

FIG. 8 is a sequence chart showing the job storage period cooperation process;

FIG. 9 is a sequence chart showing a job storage period cooperation process;

FIG. 10 is a sequence chart showing the job storage period cooperation process;

FIG. 11 is a view showing database tables of a cloud printing mediation service;

FIGS. 12A and 12B are sequence charts showing a printing process of a cloud printing system;

FIGS. 13A and 13B are sequence charts showing a printing process of a cloud printing system;

FIGS. 14A and 14B are sequence charts showing a printing process of a cloud printing system;

FIG. 15 is a view for explaining a resubmission process;

FIG. 16 is a view for explaining a cancellation process;

FIG. 17 is a view for explaining a resubmission process; and

FIG. 18 is a view for explaining a cancellation process.

DESCRIPTION OF THE EMBODIMENTS

Figure 1:
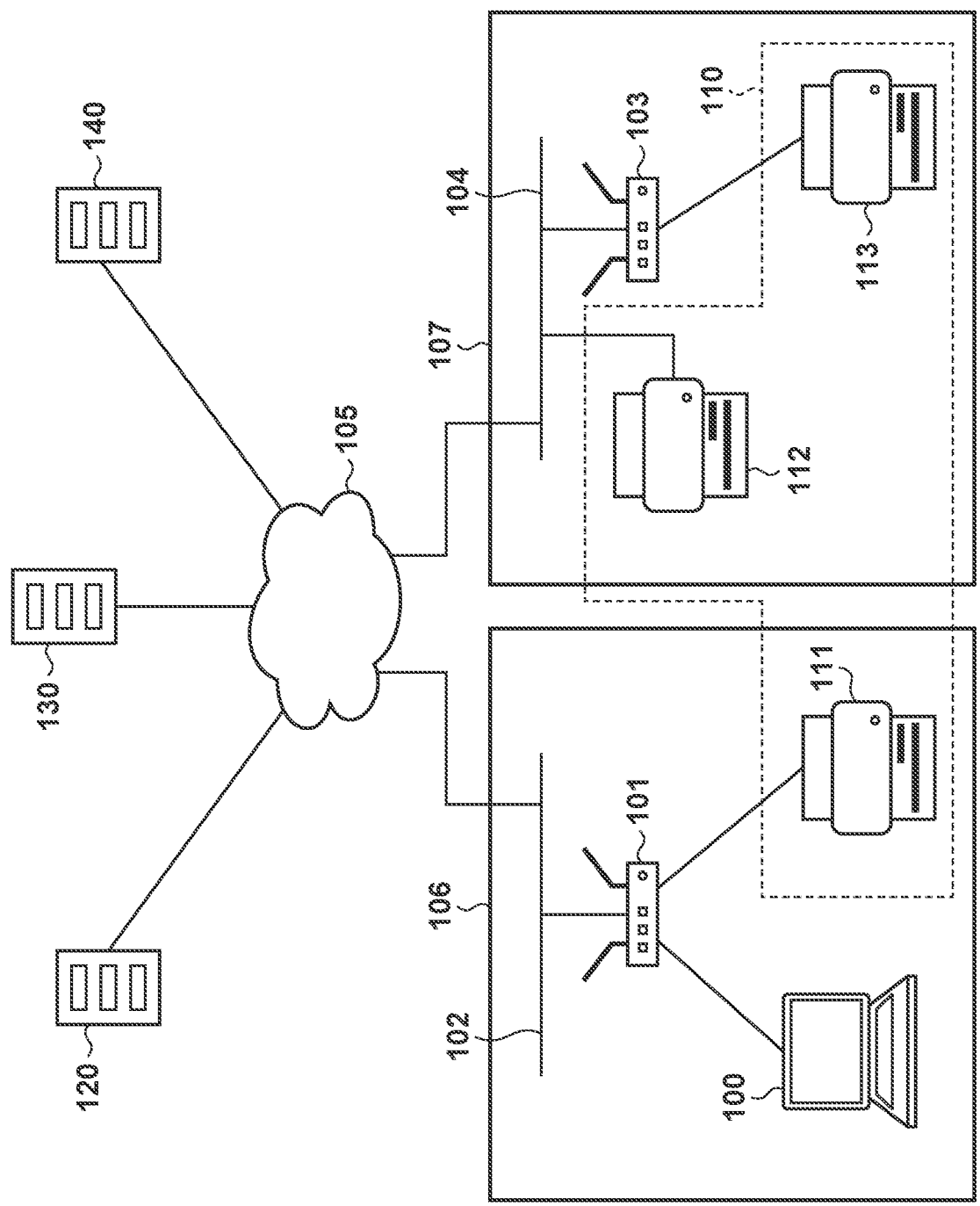
FIG. 1 is a view showing the configuration of a cloud printing system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

In the configuration of a printing system that mediates a plurality of services as described in Japanese Patent Laid-Open No. 2016-184415, since each service sets a job storage period, the job storage periods can be different between the services. If the job storage periods are different, a period in which printing is not completed despite printing being possible or a period in which printing is executed at a timing unintended by a user may occur.

According to the present disclosure, it is possible to make job storage periods cooperate between cloud services.

First Embodiment

FIG. 1 is a view showing an example of the configuration of a cloud printing system according to this embodiment. In a site 106, an information processing apparatus 100 and a printing apparatus 111 are connected to the Internet 105 via an Access Point (AP) 101 and a Local Area Network (LAN) 102. The information processing apparatus 100 and the printing apparatus 111 are not in direct communication, and they communicate with each other via a plurality of cloud services to be described later. Also in a site 107, a printing apparatus 112 is connected to the Internet 105 via a LAN 104, and a printing apparatus 113 is connected to the Internet 105 via an AP 103 and the LAN 104. The printing apparatuses 111, 112, and 113 may be different models. In this embodiment, the printing apparatuses 111, 112, and 113 are collectively referred to as printing apparatuses 110. A server that can provide a cloud printing service 120 not supporting the printing apparatus 110, a server that can provide a cloud printing mediation service 130, and a server that can provide a printing apparatus supporting cloud printing service 140 (hereinafter referred to as PA cloud printing service 140) supporting the printing apparatus 110 are also connected to the Internet 105. In the following description, for the sake of descriptive convenience, the servers will be referred to as the cloud printing service 120, the cloud printing mediation service 130, and the PA cloud printing service 140, respectively. The information processing apparatus 100 and the cloud printing mediation service 130 can communicate with the cloud printing service 120 via the Internet 105. The printing apparatus 110 and the cloud printing mediation service 130 can communicate with the PA cloud printing service 140 via the Internet 105.

The information processing apparatus 100 executes printing by the printing apparatus 110 via the cloud printing service 120, the cloud printing mediation service 130, and the PA cloud printing service 140. The cloud printing service 120 is a system that provides a printing service on the Internet 105 contracted by a company to which a user belongs. As the cloud printing service 120, for example, Universal Print® provided by Microsoft is used. The user can log in to the cloud printing service 120 from the information processing apparatus 100 to transmit print data of a print product of the company to a logical printing apparatus 121 (not shown) existing on the cloud printing service 120. Here, the logical printing apparatus 121 is a printing apparatus virtually generated on the cloud printing service 120. The information processing apparatus 100 can generate a print queue of the logical printing apparatus 121 like the printing apparatus 110.

The PA cloud printing service 140 is a system supporting the printing apparatus 110, that provides a printing service on the Internet 105. By transmitting print data of a print product of the company to a logical printing apparatus 141 (not shown) associated with the printing apparatus 110, the print product can be output from the printing apparatus 110. Here, the logical printing apparatus 141 is a printing apparatus virtually generated on the PA cloud printing service 140.

The cloud printing mediation service 130 is a cloud mediation service capable of cooperating with the cloud printing service 120 and the PA cloud printing service 140. The cloud printing mediation service 130 can mediate a print job between the cloud printing service 120 and the PA cloud printing service 140. The mediation of a print job will be described later with reference to FIGS. 4 and 5. A print job is transmitted from the information processing apparatus 100 to the logical printing apparatus 121 of the cloud printing service 120. Then, the cloud printing mediation service 130 converts the print job held by the logical printing apparatus 121 into a format compatible with the PA cloud printing service 140. The cloud printing mediation service 130 transmits the converted print job to the logical printing apparatus 141, thereby causing the printing apparatus 110 to output a print product. The cloud printing service 120 located in higher level in the process sequence up to the output of the print product is sometimes referred to as the higher level service. The PA cloud printing service 140 located in lower level in the process sequence is sometimes referred to as the lower level service.

The printing apparatus 110 caused to output the print product need not be the printing apparatus 111 in the site 106, and it may be the printing apparatus 112 or 113 in the site 107. In this case, the user can execute printing, from the information processing apparatus 100 connected to the in-company network, by the printing apparatus 110 connected to the in-company network but not supporting the cloud printing service 120. Further, an administrator of the system can manage, on the cloud printing service 120 contracted by the company, the data printed by the user.

In this embodiment, the above-described configuration example will be described as an example of the cloud printing system, but the present invention is not limited to this configuration. It is only required that the information processing apparatus 100 and the cloud printing service 120 are communicably connected to each other via a network. Further, it is only required that the printing apparatus 110 is communicably connected to the PA cloud printing service 140 and the cloud printing mediation service 130 via the network. The network may be a wireless network, a wired network, or a mixture of them. It is only required that the printing apparatus 110 can execute a printing function, so that the printing apparatus 110 may be one of a scanner and a facsimile machine, or a Multifunction Printer (MFP) added with the both functions.

Figure 2:
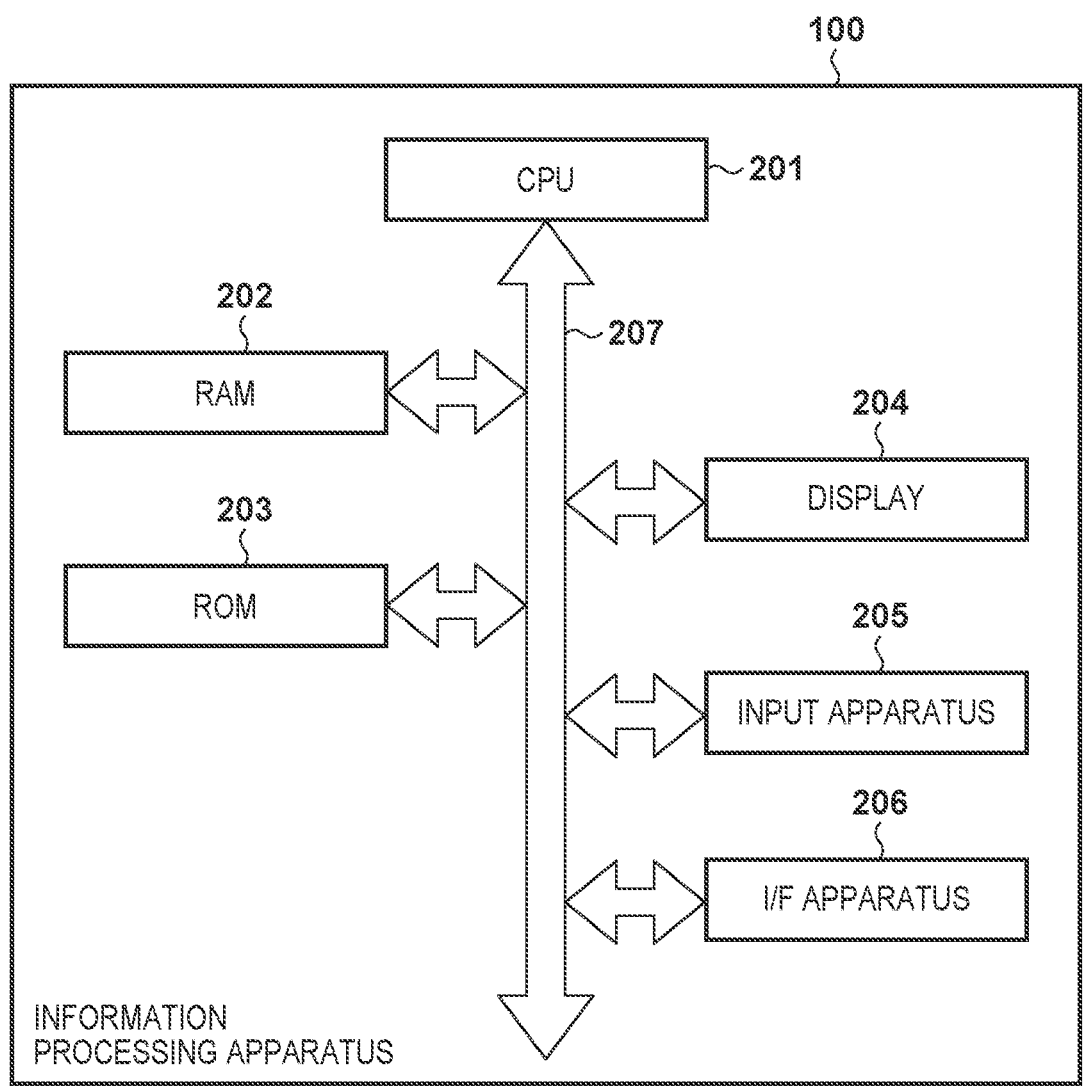
FIG. 2 is a block diagram showing the hardware arrangement of an information processing apparatus.

FIG. 2 is a block diagram showing an example of the arrangement of the information processing apparatus 100. A CPU 201 computes, determines, and controls data and commands in accordance with software stored in an RAM 202 and a ROM 203, and comprehensively controls the information processing apparatus 100. The RAM 202 is used as a temporary storage area for the CPU 201 executing various kinds of processes. The ROM 203 stores an Operating System (OS), application software, and the like. A display 204 includes, for example, a liquid crystal display and a graphic controller, and displays objects including images and icons represented by a shortcut menu and a launcher, a Graphic User Interface (GUI), and the like. An input device 205 is a device for accepting various kinds of instructions from the user to the information processing apparatus 100. An interface (I/F) device 206 enables transmission and reception of data with apparatuses on the same network and the Internet 105 by protocols such as TCP/IP using a wireless LAN and wired LAN supporting standards such as IEEE802.11a. A system bus 207 is used to transmit and receive data between respective blocks shown in FIG. 2.

FIG. 2 has been described above as showing an example of the arrangement of the information processing apparatus 100. However, the information processing apparatus 100 is not limited to the arrangement shown in FIG. 2, and has an arrangement corresponding to the function that can be executed by the information processing apparatus 100, as appropriate. The hardware arrangements of the cloud printing service 120, the cloud printing mediation service 130, and the PA cloud printing service 140 also include the hardware arrangement shown in FIG. 2. Alternatively, the arrangements of the information processing apparatus 100, the cloud printing service 120, the cloud printing mediation service 130, and PA cloud printing service 140 may be different from each other.

Figure 3:
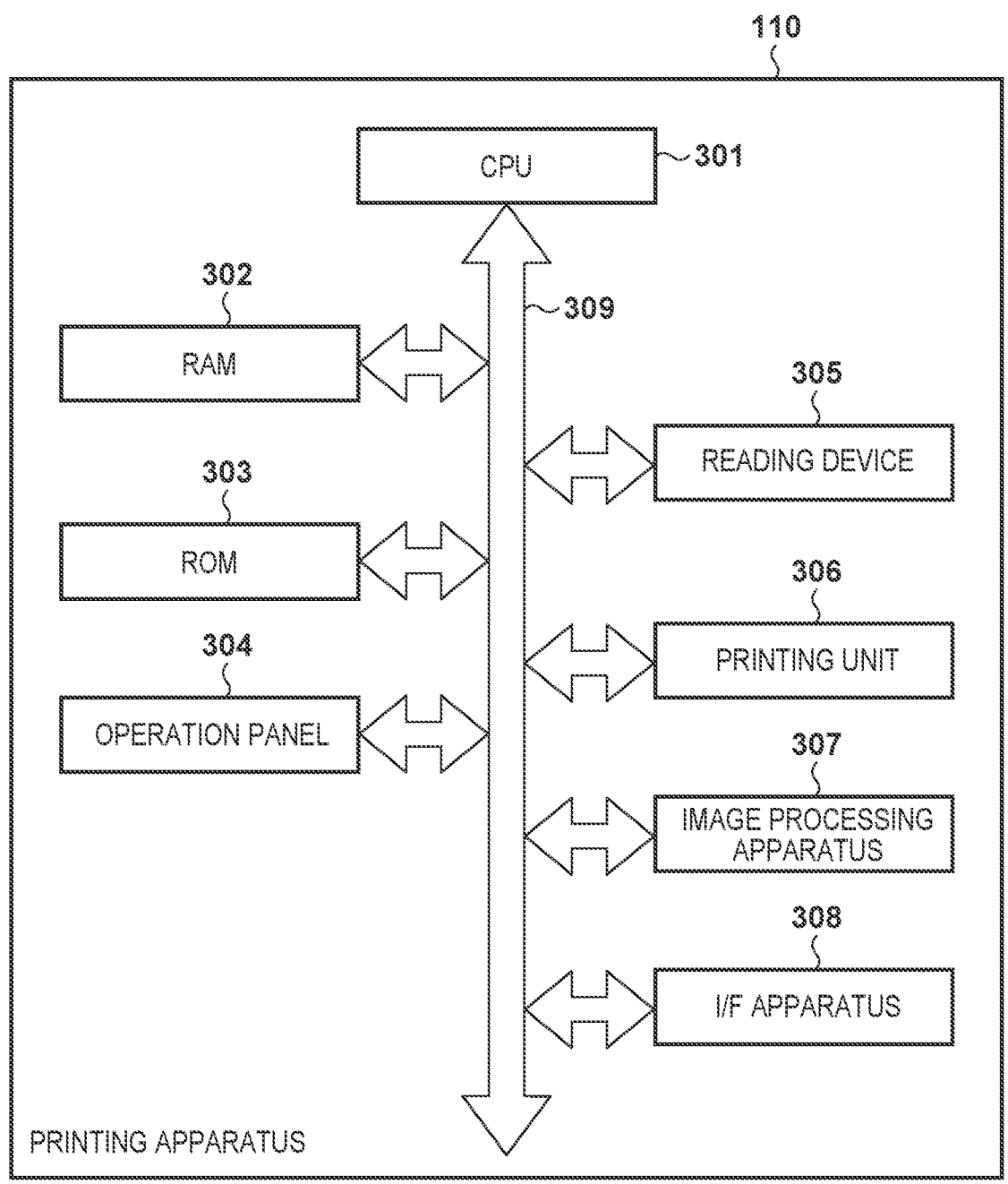
FIG. 3 is a block diagram showing the hardware arrangement of a printing apparatus.

FIG. 3 is a block diagram showing an example of the arrangement of the printing apparatus 110. A CPU 301 executes, on a RAM 302, a program stored in a ROM 303 in accordance with, for example, a user operation on an operation panel 304, thereby comprehensively controlling the printing apparatus 110. The ROM 303 stores a control instruction program of the printing apparatus 110 and the like. In addition to operating as a working memory for the CPU 301, the RAM 302 is also used as a storage area (spooler) for spooling print jobs. The operation panel 304 is configured by including keys and a touch pad for accepting a user operation, and a display that displays a screen for presenting images and various kinds of information to the user. A reading device 305 includes an optical sensor for optically reading a document set on a document table (not shown), and stores image data read by the optical sensor on the RAM 302. A printing unit 306 includes an ink tank storing ink for printing an image on a print medium, and a printhead for discharging the ink. The printing unit 306 also includes a conveyance unit that conveys a print medium, and the like, and prints an image on the print medium by an inkjet printing method. Note that the printing apparatus 110 is not limited to the inkjet printing method, and may be configured to print an image by another printing method, for example, an electrophotographic method. An image processing device 307 implements a copy function by performing image processing for causing the printing unit 306 to print image data read by the reading device 305. In this embodiment, a print job for causing the printing apparatus 110 to execute a printing process will be described. However, the operation according to this embodiment can be applied not only to a print job but also to another type of job as long as the job executes an output process executable by the printing apparatus 110. An interface (I/F) device 308 enables transmission and reception of data with apparatuses on the same network and the Internet 105 by protocols such as TCP/IP using a wireless LAN and wired LAN complying with standards such as IEEE802.11a.

Figure 4:
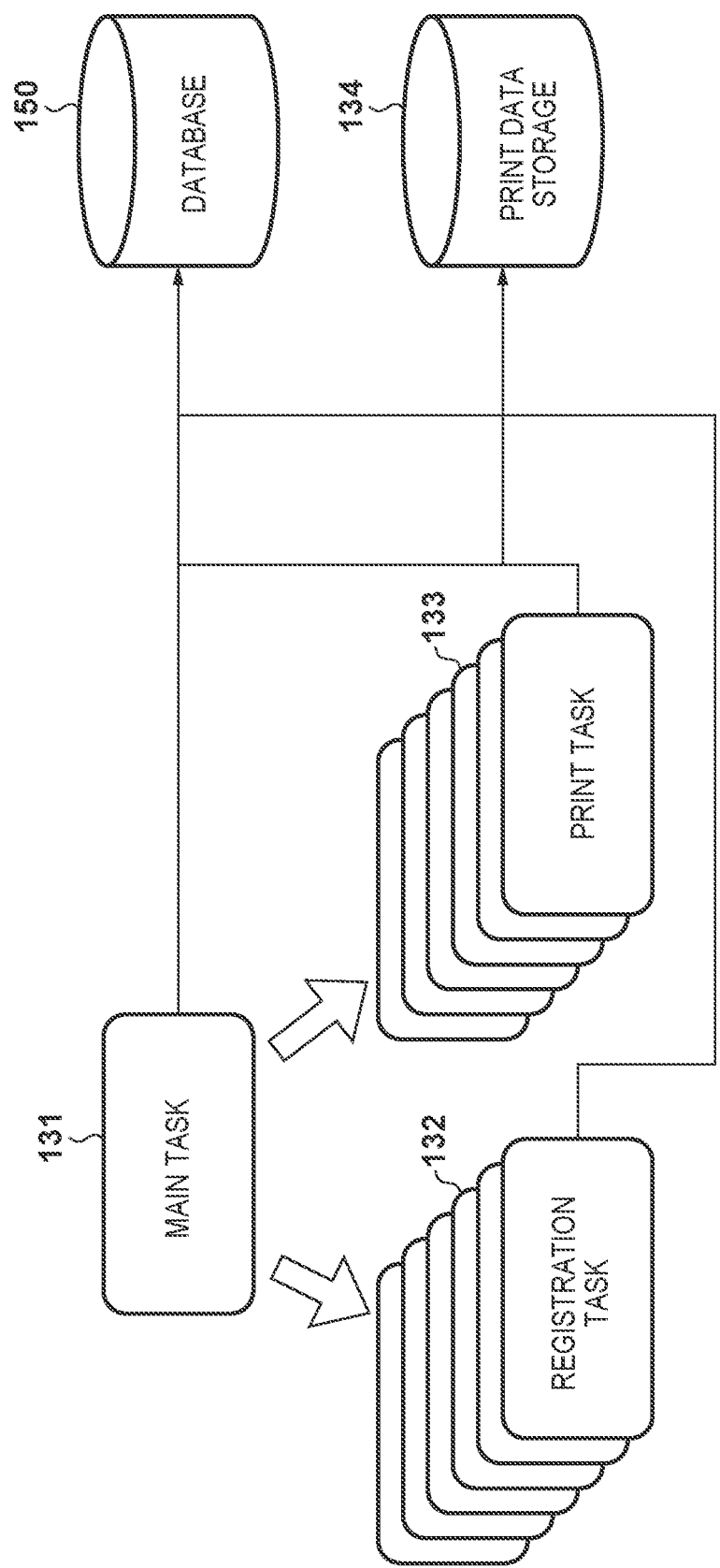
FIG. 4 is a view showing a software arrangement of a cloud printing mediation service.

FIG. 4 is a view showing an example of the software arrangement of the cloud printing mediation service 130. The cloud printing mediation service 130 has a function of registering the logical printing apparatus 121 on the cloud printing service 120, and a function of associating the logical printing apparatus 121 and the logical printing apparatus 141 with each other. The cloud printing mediation service 130 also has a function of checking the states of the logical printing apparatus 121 and logical printing apparatus 141, and a function of transmitting a Pull printing instruction. A main task 131 provides an operation screen of the cloud printing mediation service 130. The user can use the Web browser of the information processing apparatus 100 to refer to the provided operation screen and operate it. An administrator who has the administrator authority in the cloud printing service 120 can register the logical printing apparatus 121 from the cloud printing mediation service 130. In addition, the administrator can associate, from the cloud printing mediation service 130, the logical printing apparatus 121 with the logical printing apparatus 141 supporting the printing apparatus 110. With this, it is possible to execute printing via the cloud printing service 120 and the PA cloud printing service 140. The above-described registration process is executed by a registration task 132 based on a registration instruction accepted by the main task 131.

In this embodiment, when the user transmits a print job from the information processing apparatus 100 to the logical printing apparatus 121 on the cloud printing service 120, the cloud printing service 120 notifies the cloud printing mediation service 130 of the acceptance of the print job. The cloud printing mediation service 130 having received the notification requests information of the print job from the cloud printing service 120, and starts a printing process. This operation is referred to as Push printing. On the other hand, there is a case in which it is desirable to cause the cloud printing mediation service 130 to execute print jobs at once when a predetermined amount of print jobs to the logical printing apparatus 121 has been accumulated. In this case, the user can transmit a printing execution instruction to the cloud printing mediation service 130 by operating the information processing apparatus 100. This operation is referred to as Pull printing. The printing process is executed for each print job by a print task 133. Registration information and information of the print job are stored in a database 150. The information of the print job is deleted after the job storage period ends. The print data included in the print job is downloaded from the cloud printing service 120 and stored in a print data storage 134. The print data is deleted after the printing process or the job storage period ends. Each of the cloud printing service 120, the cloud printing mediation service 130, and the PA cloud printing service 140 sets the service-specific job storage period.

Figure 5:
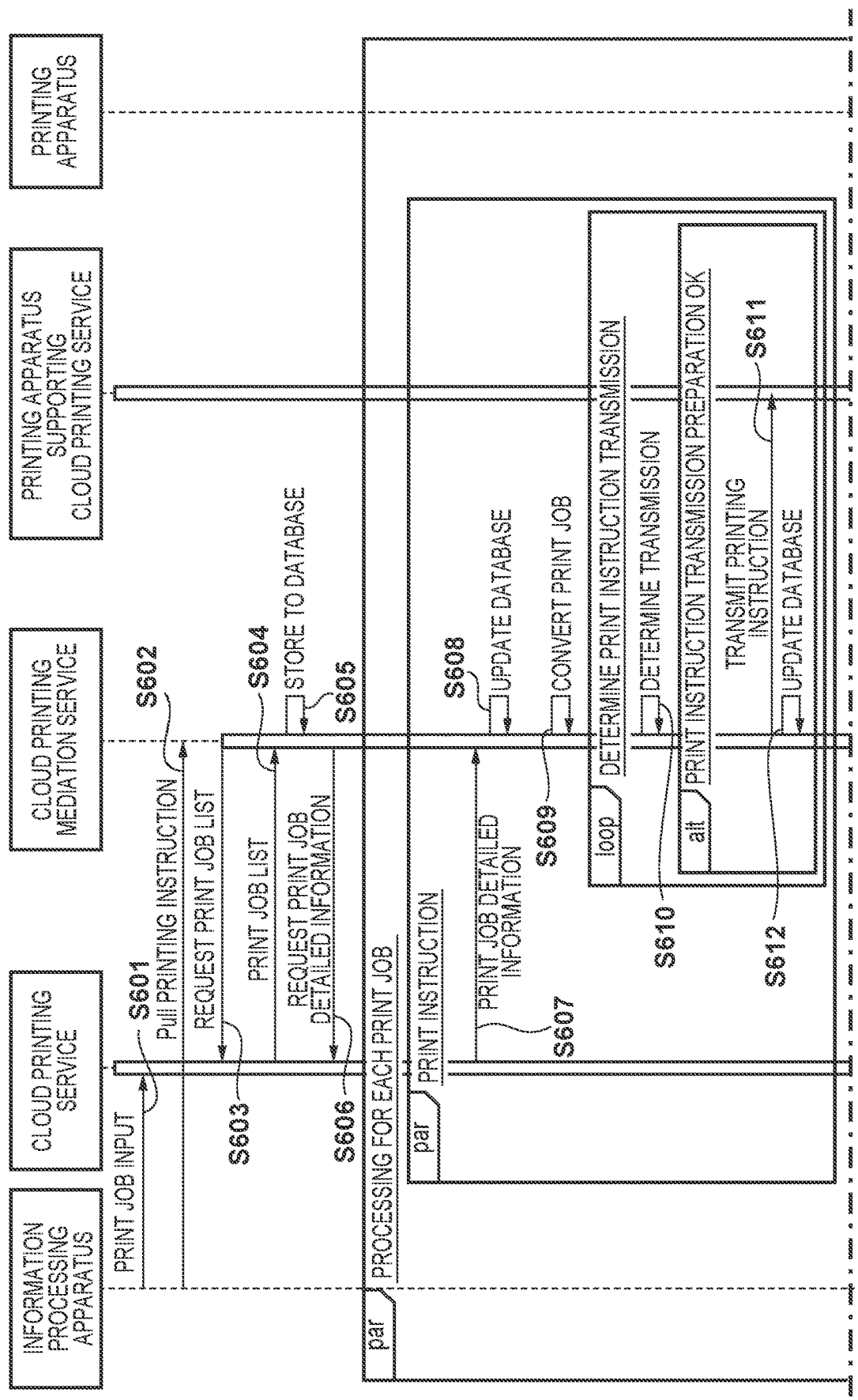
FIG. 5 is a view showing database tables of the cloud printing mediation service.

FIG. 5 is a view showing an example of tables of the database 150. The tables include a printing apparatus information table 151, a print job information table 152, and a service setting table 153. The printing apparatus information table 151 is a table that stores information for associating the cloud printing service 120, the PA cloud printing service 140, and the printing apparatus with each other. A cloud printing service printer ID 154 is identification information for identifying the logical printing apparatus 121. A printing apparatus supporting cloud printing service printer ID 155 (hereinafter referred to as a PA cloud printing service printer ID 155) is identification information for identifying the logical printing apparatus 141, and issued by the PA cloud printing service 140. A plurality of the PA cloud printing service printer IDs 155 may exist for one printing apparatus 110. A cloud printing service type 156 is information indicating the cloud printing service 120. A tenant 157 is information indicating the company or group contracting the cloud printing service, to which the user belongs. A printing apparatus name 158 is information indicating the name or product name of the printing apparatus 110. A printing apparatus model name 159 is information indicating the model name of the printing apparatus 110. An access token 160 is information indicating the access token used to access the cloud printing service 120 and the PA cloud printing service 140.

The print job information table 152 is a table that stores information of the print job acquired from the cloud printing service 120. The same item names as those in the printing apparatus information table 151 are the same as described in the printing apparatus information table 151, and a description thereof will be omitted. A cloud printing service job ID 161 indicates the ID of the print job acquired from the cloud printing service 120. A user 162 is information indicating the user who has executed printing. A print job name 163 is information indicating the name of the print job. A print job status 164 is information indicating the status of the print job such as "printing complete". A print data ID 165 indicates the management ID of the print data on the cloud printing service 120. A printing setting 166 is information indicating the printing setting such as a printing mode. A print data URL 167 is information indicating the storage destination of the print data on the print data storage 134. A print job acceptance time 168 is information indicating the time at which the print job has been submitted from the information processing apparatus 100 to the cloud printing service 120. A print job transmission state 169 is information indicating the transmission state of the print job with respect to the PA cloud printing service 140. A print data download state 170 is information indicating the download state of the print data from the cloud printing service 120. A print job identification name 171 is information for identifying the print job in the PA cloud printing service 140. A print job transmission time 172 is information indicating the time at which the print data has been submitted to the PA cloud printing service 140 by the cloud printing mediation service 130.

The service setting table 153 is a table that stores information concerning the job storage period of each service. A cloud printing service job storage period 173 is information indicating the job storage period of the cloud printing service 120. A printing apparatus supporting cloud printing service job storage period 174 is information indicating the job storage period of the PA cloud printing service 140.

Figure 6:
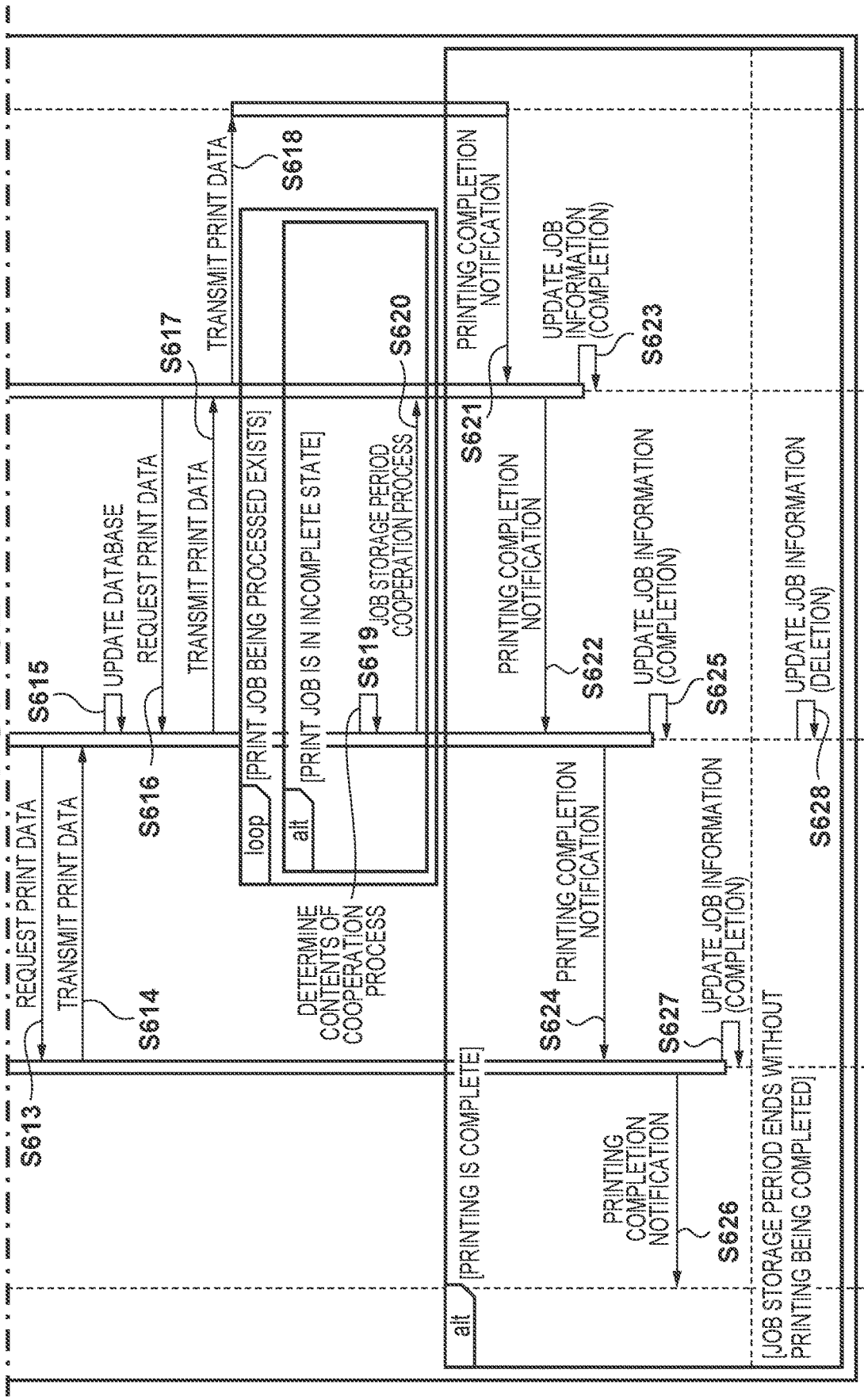
FIGS. 6A and 6B are sequence charts showing a printing process of a cloud printing system.

FIGS. 6A and 6B are sequence charts showing an example of a printing process executed by the cloud printing mediation system according to this embodiment. In this embodiment, a printing process by Pull printing will be described as an example, but it may be Pull printing. By a function of the OS of the information processing apparatus 100, the information processing apparatus 100 is set in advance in a state in which it can submit a print job to the logical printing apparatus 121 registered on the cloud printing service 120. For the sake of descriptive convenience, the process of submitting a print job to the logical printing apparatus 121 will be represented as submitting a print job to the cloud printing service 120. First, in accordance with a user operation, the information processing apparatus 100 submits a plurality of print jobs to the cloud printing service 120 (S601). Then, the information processing apparatus 100 transmits, to the cloud printing mediation service 130, a Pull printing instruction corresponding to the logical printing apparatus 121 which is the submission destination of the print jobs (S602). The cloud printing mediation service 130 having received the Pull printing instruction makes an acquisition request of a list of print jobs held by the logical printing apparatus 121 to the cloud printing service 120 (S603). The cloud printing service 120 having accepted the acquisition request of the list of print jobs transmits, to the cloud printing mediation service 130, the list of print jobs held by the logical printing apparatus 121 (S604).

Thereafter, if a plurality of jobs have been acquired, the cloud printing mediation service 130 executes them in parallel by the print tasks 133. Each print job acquired in S604 includes the minimum information necessary to identify the print job, such as the cloud printing service job ID 161 and the print data ID 165. The cloud printing mediation service 130 stores each print job in the database 150 (S605). The print task 133 acquires print job detailed information and instructs printing in parallel with acquisition of the print data. That is, processing from S606 to S612 and the processing from S613 to S615 are performed in parallel.

In accordance with the print task 133, the cloud printing mediation service 130 requests to acquire the print job detailed information from the cloud printing service 120 (S606). In response to the request, the cloud printing service 120 transmits the print job detailed information to the cloud printing mediation service 130 (S607). The print job detailed information acquired in S607 includes the remaining pieces of information such as the print job name 163, the print job status 164, and the printing setting 166 described for the print job information table 152. In accordance with the print task 133, the cloud printing mediation service 130 updates the print job stored in the database 150 in S605 with the acquired print job detailed information (S608). In accordance with the print task 133, the cloud printing mediation service 130 converts the print job into a format processable by the PA cloud printing service 140 (S609).

In accordance with the print task 133, the cloud printing mediation service 130 checks the states of all the print jobs currently being processed in the cloud printing mediation service 130, and determines whether the print job being processed can be transmitted to the PA cloud printing service 140 (S610). If it is determined that the print job can be transmitted because the above-described conversion is complete or the like, the cloud printing mediation service 130 changes the print job transmission state 169 to "transmission preparation OK". If the print job transmission state 169 is "transmission preparation OK", in accordance with the print task 133, the cloud printing mediation service 130 transmits the converted print job to the PA cloud printing service 140 as a printing instruction (S611). Then, the cloud printing mediation service 130 changes the print job transmission state 169 to "transmitted" (S612). In accordance with the print task 133, the cloud printing mediation service 130 repeats processing from S610 to S612 until the print job whose print job transmission state 169 has not changed to "transmitted" at this time is changed to "transmitted".

In accordance with the print task 133, in parallel with the print instruction transmission processing described above, the cloud printing mediation service 130 requests to download the print data from the cloud printing service 120 (S613). In response to the request to download the print data, the cloud printing service 120 transmits the print data to the cloud printing mediation service 130 (S614). The processing in S614 takes longer to complete as the amount of print data increases. When download of the print data is complete, in accordance with the print task 133, the cloud printing mediation service 130 changes the print data download state 170 to "OK". Then, the cloud printing mediation service 130 stores, as the print data URL 167, the URL of the print data stored on the print data storage 134 (S615).

The PA cloud printing service 140 having received the print instruction in S611 transmits a print data download request to the cloud printing mediation service 130 (S616). The print data URL 167 is used as the request destination in S616. The cloud printing mediation service 130 having received the print data download request transmits the print data to the PA cloud printing service 140 (S617).

The PA cloud printing service 140 having received the print data transmits the print data to the printing apparatus 110 (S618). The print data transmitted in S618 includes a print execution command to the printing apparatus 110. The printing apparatus 110 executes printing based on the received print data. At this time, if the printing apparatus 110 is not in a state in which it can print, printing is not executed, and a notification indicating this is transmitted to the PA cloud printing service 140. After a predetermined period has elapsed, the cloud printing mediation service 130 checks the print job held by it, and determines the contents of a cooperation process for the print job that requires cooperation of the job storage periods between the cloud services (S619). The processing in S619 will be described later with reference to FIG. 7. For the job that requires cooperation of the job storage periods, the cloud printing mediation service 130 executes a job storage period cooperation process with respect to the PA cloud printing service 140 which is the print request destination of the print job (S620). The process in S620 will be described later with reference to FIG. 8. The processing in S619 is periodically executed in accordance with the print task 133 until the print job held by the cloud printing mediation service 130 is completed or deleted.

When the printing is complete, the printing apparatus 110 transmits a printing completion notification to the PA cloud printing service 140 (S621). Then, the PA cloud printing service 140 updates the information of the print job managed by the self-apparatus (S623), and transmits a printing completion notification to the cloud printing mediation service 130 (S622). The cloud printing mediation service 130 updates the information of the print job managed by the self-apparatus (S625), and transmits a printing completion notification to the cloud printing service 120 (S624). The cloud printing service 120 updates the information of the print job managed by the self-apparatus (S627), and transmits a printing completion notification to the information processing apparatus 100 (S626). If the job storage period ends before the printing apparatus 110 becomes able to print, it is determined that cooperation of the job storage periods is unnecessary, and the print job is deleted (S628).

Figure 7:
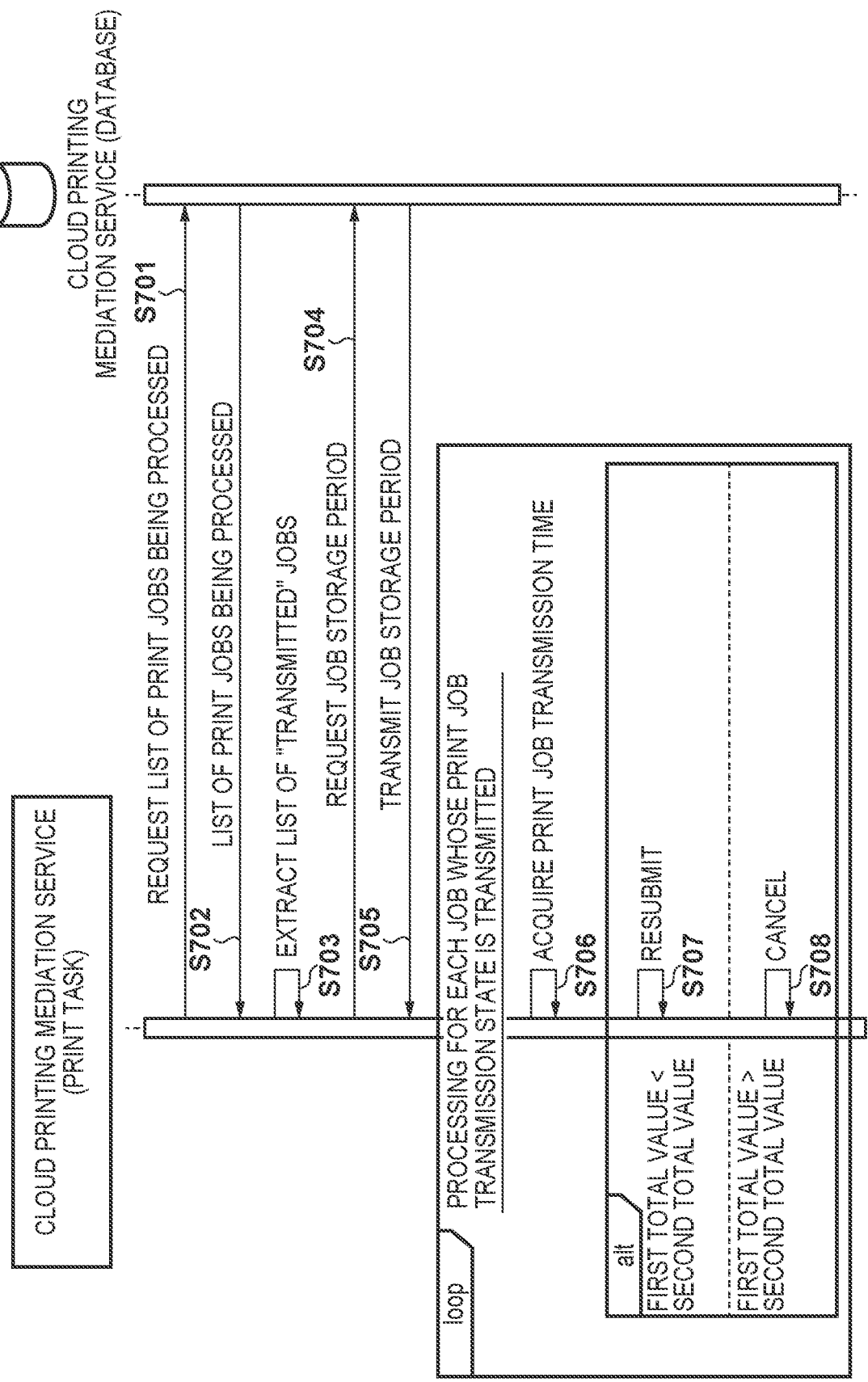
FIG. 7 is a sequence chart showing a job storage period cooperation process.

FIG. 7 is a sequence chart showing a process of determining the contents of the process for the job, among the print jobs held by the cloud printing mediation service 130, that requires cooperation of the job storage periods. The print task 133 processing each print job on the cloud printing mediation service 130 transmits, to the database 150, an acquisition request of a list of print jobs currently being processed by the cloud printing mediation service 130 (S701). The database 150 having received the acquisition request of the list of print jobs transmits the list of print jobs to the print task 133 (S702).

The print task 133 refers to the print job information tables 152 of the received list of print jobs, and extracts a list of jobs whose print job transmission states 169 are "transmitted" (S703). Then, the print task 133 refers to the service setting table 153, and transmits an acquisition request of the job storage period 173 of the cloud printing service 120 and the job storage period 174 of the PA cloud printing service 140 (S704). In response to the request, the database 150 transmits, to the print task 133, the job storage period 173 of the cloud printing service 120 and the job storage period 174 of the PA cloud printing service 140 (S705). Here, the job storage period 173 and job storage period 174 to be transmitted have been set upon associating the cloud printing service 120 and the PA cloud printing service 140 with each other.

The print task 133 checks the print job transmission time 172 for each of the jobs in the list of "transmitted" print jobs extracted in S703 (S706). Then, the print task 133 determines the contents of the job storage period cooperation process. The print task 133 compares the total value (first total value) of the print job transmission time 172 of the job serving as the determination target and the job storage period 174 acquired in S705 with the total value (second total value) of the print job acceptance time 168 and the job storage period 173.

As a result of the comparison, if the first total value does not exceed the second total value, the print task 133 executes a resubmission process of the job to the PA cloud printing service 140 as the job storage period cooperation process (S707). On the other hand, if the first total value exceeds the second total value, the print task 133 executes a cancellation process of the job in the PA cloud printing service 140 as the job storage period cooperation process (S708). Thereafter, either of the resubmission process and the cancellation process is executed in accordance with the comparison result described above.

FIG. 8 is a sequence chart showing the job storage period cooperation process between the cloud printing service 120 serving as the printing request source of the print job and the PA cloud printing service 140 serving as the printing request destination of the print job. In FIG. 8, either of the resubmission process and the cancellation process determined in FIG. 7 is executed.

If the resubmission process in S707 is executed, the cloud printing mediation service 130 checks whether the current time exceeds the first total value (S801). If the current time exceeds the first total value, the cloud printing mediation service 130 transmits the same printing instruction as in S611 to the PA cloud printing service 140 (S802), and transmits the same print data as in S617 to the PA cloud printing service 140 (S803). After confirming the transmissions, the cloud printing mediation service 130 updates the print job identification name 171 and the print job transmission time 172 of the print job serving as the process target in the print job information table 152 (S804).

Here, an example of the operation of the resubmission process described above will be described with reference to FIG. 15. FIG. 15 shows the cloud printing service 120, the cloud printing mediation service 130, and the PA cloud printing service 140 from the top. The abscissa represents a time axis. Time 1501 is the print job acceptance time 168, and indicates time "1:00" at which the print job has been submitted from the information processing apparatus 100 to the cloud printing service 120. Here, the job storage period 173 of the cloud printing service 120 is "five hours", and time 1502 indicates time "6:00" at which the job storage period 173 has elapsed from time 1501. Note that time 1502 corresponds to the "second total value" in the description of FIG. 7.

Time 1503 is the print job transmission time 172, and indicates time "2:50" at which the print job has been transmitted from the cloud printing mediation service 130 to the PA cloud printing service 140. Here, the job storage period 174 of the PA cloud printing service 140 is "one hour", and time 1504 indicates time "3:50" at which the job storage period 174 has elapsed from time 1503. Note that time 1504 corresponds to the "first total value" in the description of FIG. 7.

As shown in FIG. 15, time 1504 (first total value)<time 1502 (second total value). Accordingly, the resubmission process in S707 is executed. It is checked in S801 of FIG. 8 whether current time 1505 exceeds time 1504 (first total value). FIG. 15 shows a case in which current time 1505 exceeds time 1504 (first total value). In this case, by the processing in S802 and the processing in S803, the print instruction and the print data are transmitted to the PA cloud printing service 140. That is, at a timing exceeding the storage period 174 of the PA cloud printing service 140, the print job is resubmitted to the PA cloud printing service 140. As a result, it can be prevented that the job is deleted because the job storage period has expired on the PA cloud printing service 140 side even though the job storage period of the cloud printing service 120 serving as the higher level service is still effective.

On the other hand, if the cancellation process in S708 is executed, it is checked whether the current time exceeds the second total value (S805). If the current time exceeds the second total value, the cloud printing mediation service 130 transmits a job cancellation request to the PA cloud printing service 140 (S806). Then, the cloud printing mediation service 130 checks the job state in the PA cloud printing service 140 (S807). After confirming that the job has been deleted from the PA cloud printing service 140, the cloud printing mediation service 130 transmits, to the database 150, a request to delete the job serving as the process target from the print job information table 152 (S808). That is, at a timing exceeding the job storage period 173 of the cloud printing service 120, the print job is canceled in the PA cloud printing service 140. As a result of the cancellation, the job storage period is interrupted in the PA cloud printing service 140.

Here, an example of the operation of the cancellation process described above will be described with reference to FIG. 16. FIG. 16 shows the cloud printing service 120, the cloud printing mediation service 130, and the PA cloud printing service 140 from the top. The abscissa represents a time axis. Time 1601 is the print job acceptance time 168, and indicates time "1:00" at which the print job has been submitted from the information processing apparatus 100 to the cloud printing service 120. Here, the job storage period 173 of the cloud printing service 120 is "one hour", and time 1602 indicates time "2:00" at which the job storage period 173 has elapsed from time 1601. Note that time 1602 corresponds to the "second total value" in the description of FIG. 7.

Time 1603 is the print job transmission time 172, and indicates time "2:50" at which the print job has been transmitted from the cloud printing mediation service 130 to the PA cloud printing service 140. Here, the job storage period 174 of the PA cloud printing service 140 is "five hours", and time 1604 indicates time "7:50" at which the job storage period 174 has elapsed from time 1603. Note that time 1604 corresponds to the "first total value" in the description of FIG. 7.

As shown in FIG. 16, time 1604 (first total value)>time 1602 (second total value). Accordingly, the cancellation process in S708 is executed. It is checked in S805 of FIG. 8 whether current time 1605 exceeds time 1602 (second total value). FIG. 16 shows a case in which current time 1605 exceeds time 1602 (second total value). In this case, by the processing in S806 and the processing in S807, the job cancellation request and the job state check are transmitted to the PA cloud printing service 140. That is, at a timing exceeding the job storage period 173 of the cloud printing service 120, the print job is canceled in the PA cloud printing service 140. As a result, it can be prevented that the job is continuously stored on the PA cloud printing service 140 side even though the job storage period of the cloud printing service 120 serving as the higher level service has expired.

As has been described above, in this embodiment, the job storage period of the PA cloud printing service 140 is changed in accordance with the job storage period of the cloud printing service 120 serving as the higher level service. Accordingly, the job storage periods set on the respective services can be made to cooperate with each other. With this configuration, the information of the job state displayed on the information processing apparatus 100 and the job state in the PA cloud printing service 140 can be matched. Thus, it is possible to eliminate a period in which printing is not completed despite printing being possible, and a period in which printing is executed at a timing unintended by the user, and job storage information that does not confuse the user can be provided.

Second Embodiment

The second embodiment will be described below with respect to points different from the first embodiment. In the first embodiment, the operation has been described in which the job storage period of the cloud printing service 120 serving as the higher level service is used as the reference to make the job storage periods cooperate between the higher level service and the lower level service. In this embodiment, an operation will be described in which the job storage period of a PA cloud printing service 140 serving as the lower level service is used as the reference to make the job storage periods cooperate between the higher level service and the lower level service.

FIG. 9 is a chart showing the sequence for determining the contents of the process for the job, among the print jobs held by a cloud printing mediation service 130, that requires cooperation of the job storage periods. The process in S1001 to S1005 is the same as described in S701 to S705 of FIG. 7, and a description thereof will be omitted.

A print task 133 checks a print job transmission time 172 for each of the jobs in a list of print jobs extracted in S1003 (S1006). Then, the print task 133 determines the contents of the job storage period cooperation process. The print task 133 compares the total value (first total value) of the print job transmission time 172 of the job serving as the determination target and a job storage period 174 acquired in S1005 with the total value (second total value) of a print job acceptance time 168 and a job storage period 173.

As a result of the comparison, if the first total value exceeds the second total value, the print task 133 executes a resubmission process of the job to a cloud printing service 120 as the job storage period cooperation process (S1007). On the other hand, if the first total value does not exceed the second total value, the print task 133 executes a cancellation process of the job in the cloud printing service 120 as the job storage period cooperation process (S1008). Thereafter, either of the resubmission process and the cancellation process is executed in accordance with the comparison result described above. S1007 and S1008 determined as described above will be described later with reference to FIG. 10.

FIG. 10 is a sequence chart showing the job storage period cooperation process between the cloud printing service 120 serving as the printing request source of the print job and the PA cloud printing service 140 serving as the printing request destination of the print job. In FIG. 10, either of the resubmission process and the cancellation process determined in FIG. 9 is executed.

If the resubmission process in S1007 is executed, the cloud printing mediation service 130 checks whether the current time exceeds the second total value (S1101). If the current time exceeds the second total value, the cloud printing mediation service 130 transmits a printing instruction to the cloud printing service 120 (S1102), and transmits the same print data as in S617 to the cloud printing service 120 (S1103). After confirming the transmissions, the cloud printing mediation service 130 updates a cloud printing service job ID 161, a print data ID 165, and the print job acceptance time 168 of the print job serving as the process target in a print job information table 152 (S1104). That is, at a timing exceeding the job storage period 173 of the cloud printing service 120, the print job is resubmitted to the cloud printing service 120.

Here, an example of the operation of the resubmission process described above will be described with reference to FIG. 17. FIG. 17 shows the cloud printing service 120, the cloud printing mediation service 130, and the PA cloud printing service 140 from the top. The abscissa represents a time axis. Time 1701 is the print job acceptance time 168, and indicates time "1:00" at which the print job has been submitted from an information processing apparatus 100 to the cloud printing service 120. Here, the job storage period 173 of the cloud printing service 120 is "one hour", and time 1702 indicates time "2:00" at which the job storage period 173 has elapsed from time 1701. Note that time 1702 corresponds to the "second total value" in the description of FIG. 9.

Time 1703 is the print job transmission time 172, and indicates time "2:50" at which the print job has been transmitted from the cloud printing mediation service 130 to the PA cloud printing service 140. Here, the job storage period 174 of the PA cloud printing service 140 is "five hours", and time 1704 indicates time "7:50" at which the job storage period 174 has elapsed from time 1703. Note that time 1704 corresponds to the "first total value" in the description of FIG. 9.

As shown in FIG. 17, time 1704 (first total value)>time 1702 (second total value). Accordingly, the resubmission process in S1007 is executed. It is checked in S1101 of FIG. 10 whether current time 1705 exceeds time 1702 (second total value). FIG. 17 shows a case in which current time 1705 exceeds time 1702 (second total value). In this case, by the processing in S1102 and the processing in S1103, the print instruction and the print data are transmitted to the cloud printing service 120. That is, at a timing exceeding the job storage period 173 of the cloud printing service 120, the print job is resubmitted to the cloud printing service 120. As a result, it can be prevented that the job is deleted because the job storage period has expired on the cloud printing service 120 side even though the job storage period of the PA cloud printing service 140 serving as the lower level service is still effective.

On the other hand, if the cancellation process in S1008 is executed, it is checked whether the current time exceeds the first total value (S1105). If the current time exceeds the first total value, the cloud printing mediation service 130 transmits a job cancellation request to the cloud printing service 120 (S1106). Then, the cloud printing mediation service 130 checks the job state in the cloud printing service 120 (S1107). After confirming that the job has been deleted from the cloud printing service 120, the cloud printing mediation service 130 transmits, to a database 150, a request to delete the job serving as the process target from the print job information table 152 (S1108). That is, at a timing exceeding the job storage period 174 of the PA cloud printing service 140, the print job is canceled in the cloud printing service 120. As a result of the cancellation, the job storage period is interrupted in the cloud printing service 120.

Here, an example of the operation of the cancellation process described above will be described with reference to FIG. 18. FIG. 18 shows the cloud printing service 120, the cloud printing mediation service 130, and the PA cloud printing service 140 from the top. The abscissa represents a time axis. Time 1801 is the print job acceptance time 168, and indicates time "1:00" at which the print job has been submitted from the information processing apparatus 100 to the cloud printing service 120. Here, the job storage period 173 of the cloud printing service 120 is "five hours", and time 1802 indicates time "6:00" at which the job storage period 173 has elapsed from time 1801. Note that time 1802 corresponds to the "second total value" in the description of FIG. 9.

Time 1803 is the print job transmission time 172, and indicates time "2:50" at which the print job has been transmitted from the cloud printing mediation service 130 to the PA cloud printing service 140. Here, the job storage period 174 of the PA cloud printing service 140 is "one hour", and time 1804 indicates time "3:50" at which the job storage period 174 has elapsed from time 1803. Note that time 1804 corresponds to the "first total value" in the description of FIG. 9.

As shown in FIG. 18, time 1804 (first total value)<time 1802 (second total value). Accordingly, the cancellation process in S1008 is executed. It is checked in S1105 of FIG. 11 whether current time 1805 exceeds time 1804 (first total value). FIG. 18 shows a case in which current time 1805 exceeds time 1804 (first total value). In this case, by the processing in S1106 and the processing in S1107, the job cancellation request and the job state check are transmitted to the cloud printing service 120. That is, at a timing exceeding the job storage period 174 of the PA cloud printing service 140, the print job is canceled in the cloud printing service 120. As a result, it can be prevented that the job is continuously stored on the cloud printing service 120 side even though the job storage period of the PA cloud printing service 140 serving as the lower level service has expired.

As has been described above, in this embodiment, the job storage period of the cloud printing service 120 is changed in accordance with the job storage period of the PA cloud printing service 140 serving as the lower level service. Accordingly, the job storage periods set on the respective services can be made to cooperate with each other. With this configuration, it is possible to make the job storage periods cooperate with each other without applying a load on the database of the PA cloud printing service 140. Further, it is possible to eliminate a period in which printing is not completed despite printing being possible, and a period in which printing is executed at a timing unintended by the user, so that job storage information that does not confuse the user can be provided to the user.

Third Embodiment

The third embodiment will be described below with respect to points different from the first and second embodiments. In the first embodiment, the process has been described in which the job storage period of the higher level service is used as the reference to make the job storage periods cooperate between the higher level service and the lower level service. In the second embodiment, the process has been described in which the job storage period of the lower level service is used as the reference to make the job storage periods cooperate with each other. In this embodiment, a configuration for early notification to the user of the possibility of an error occurring in a printing apparatus 110 will be described.

FIG. 11 is a view showing an example of tables of a database 150 in this embodiment. In this embodiment, a print job information table 1202 includes a printing completion estimated time 1223. A cloud printing service print ID 1204 to an access token 1210 in FIG. 11 are the same as in the description concerning the cloud printing service printer ID 154 to the access token 160 in FIG. 5. A cloud printing service job ID 1211 to a print job transmission time 1222 in FIG. 11 are the same as in the description concerning the cloud printing service job ID 161 to the print job transmission time 172 in FIG. 5. A cloud printing service job storage period 1224 to a printing apparatus supporting cloud printing service job storage period 1225 in FIG. 11 are the same as in the description concerning the cloud printing service job storage period 173 to the printing apparatus supporting cloud printing service job storage period 174 in FIG. 5.

Figure 12B:
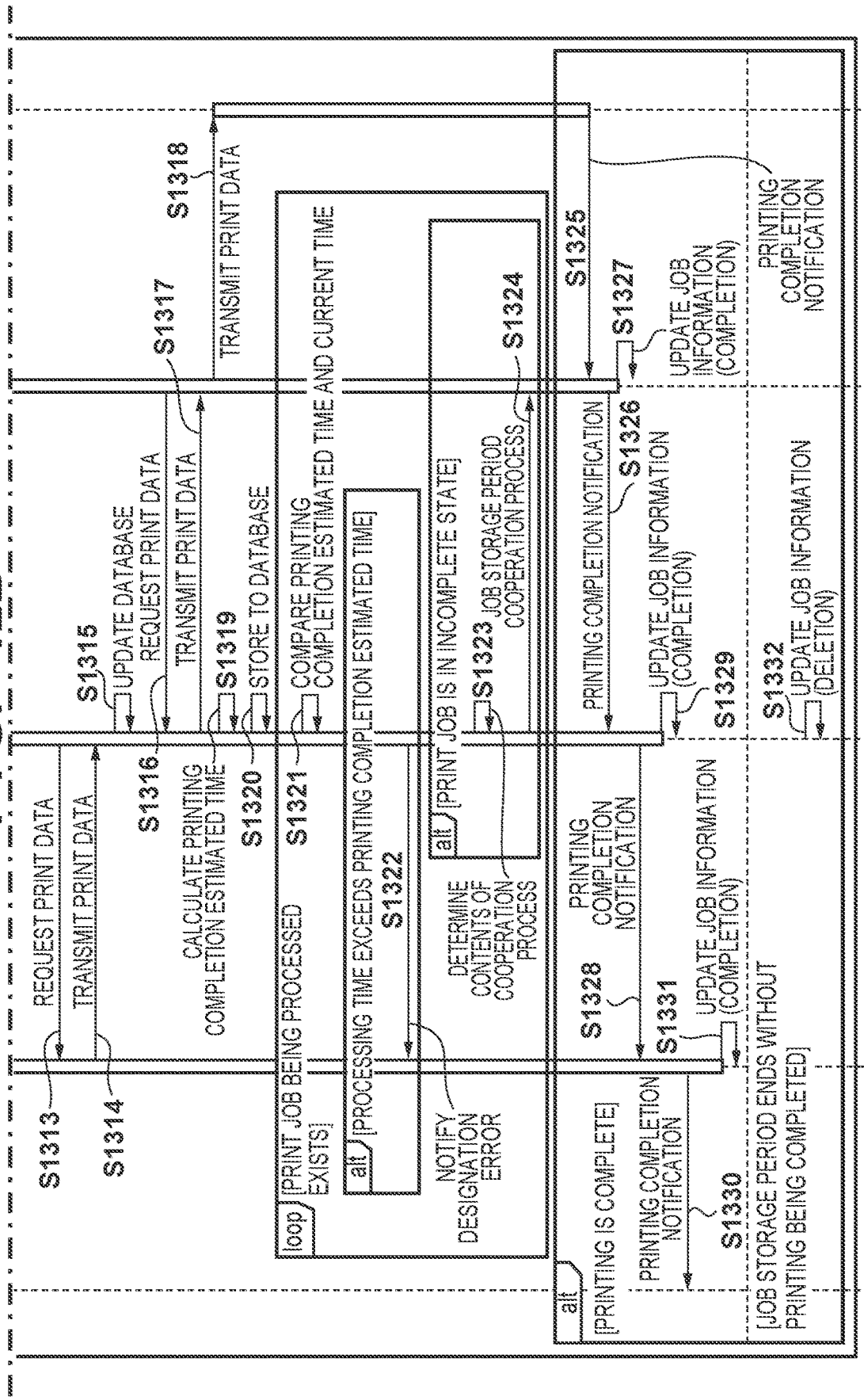

FIGS. 12A and 12B are sequence charts showing an example of a printing process executed by the cloud printing system according to this embodiment. In this embodiment, after a cloud printing mediation service 130 transmits print data to a PA cloud printing service 140, the printing completion estimated time 1223 is calculated. If printing is not completed before the printing completion estimated time, the cloud printing mediation service 130 transmits an estimated error notification to a cloud printing service 120.

S1301 to S1318 are the same as in the description concerning S601 to S618 of FIGS. 6A and 6B.

The PA cloud printing service 140 having received the print data transmitted in S1317 transmits the print data to the printing apparatus 110 in S1318. The print data transmitted in S1318 includes an instruction command to the printing apparatus 110. The instruction command is a print job converted in S1309. The printing apparatus 110 executes printing based on the received print data.

In S1319, the cloud printing mediation service 130 calculates the printing completion estimated time 1223. The cloud printing mediation service 130 may calculate the printing completion estimated time 1223 based on, for example, the size of the print data and the performance information (scanning speed, resolution, and the like) of the printhead acquired from the printing apparatus supporting cloud printing service printer ID 1205. The printing completion estimated time 1223 calculated in S1321 is stored in a print job information table 1202 (S1320).

In accordance with a print task 133, the cloud printing mediation service 130 compares the current time with the printing completion estimated time 1223 (S1321). If the current time exceeds the printing completion estimated time 1223 and it has been detected that no printing completion notification has been received, the cloud printing mediation service 130 transmits an estimated error notification to the cloud printing service 120 in S1322. In this case, in addition to the cloud printing service 120, the notification may be given by mail to information (for example, a mobile terminal) corresponding to the user registered in advance. Subsequent S1323 to S1332 are the same as in the description concerning S619 to S628 of FIGS. 6A and 6B.

The estimated error notification notified in this embodiment is not transmitted after the details of an error are received from the PA cloud printing service 140, but it is a notification to notify the possibility of occurrence of an error. During executing the process by the PA cloud printing service 140, if the process takes a longer time than in a normal case due to a factor that delays printing or a factor that prevents printing, the estimated error notification is transmitted at a stage before an error notification.

Displaying the estimated error notification with respect to the user can allow the user to eliminate, at an earlier timing, the factor that delays printing or the factor that prevents printing. As a result, printing is more likely to be completed before an error notification indicating that printing cannot be completed due to a paper jam or the like is transmitted.

Fourth Embodiment

The fourth embodiment will be described below with respect to points different from the first to third embodiments. In the first embodiment, it has been described that the cloud printing mediation service 130 holds in advance the job storage period 173 of the cloud printing service 120 and the job storage period 174 of the PA cloud printing service 140. In this embodiment, a cloud printing mediation service 130 does not hold information of the job storage periods in advance. In this embodiment, the cloud printing mediation service 130 can recognize that the print job has been deleted in each of a cloud printing service 120 and a PA cloud printing service 140.

In general, the capacity of a database on a cloud is limited. Hence, a job may be deleted after the storage period has elapsed. In this embodiment, if the job is deleted in the PA cloud printing service 140, a print job deletion notification is transmitted from the PA cloud printing service 140 to the cloud printing mediation service 130. In addition, if the job is deleted in the cloud printing service 120, a print job deletion notification is transmitted from the cloud printing service 120 to the cloud printing mediation service 130. The configuration for enabling the cloud printing mediation service 130 to recognize that the print job has been deleted in each of the cloud printing service 120 and the PA cloud printing service 140 is not limited to the above-described configuration, and another configuration may be used. For example, the cloud printing mediation service 130 may periodically transmit, to the cloud printing service 120, a request for checking the existence of the job on the cloud printing service 120 to recognize the timing of deletion of the job. Further, the cloud printing mediation service 130 may periodically transmit, to the PA cloud printing service 140, a request for checking the existence of the job on the PA cloud printing service 140 to recognize the timing of deletion of the job.

Figure 13B:
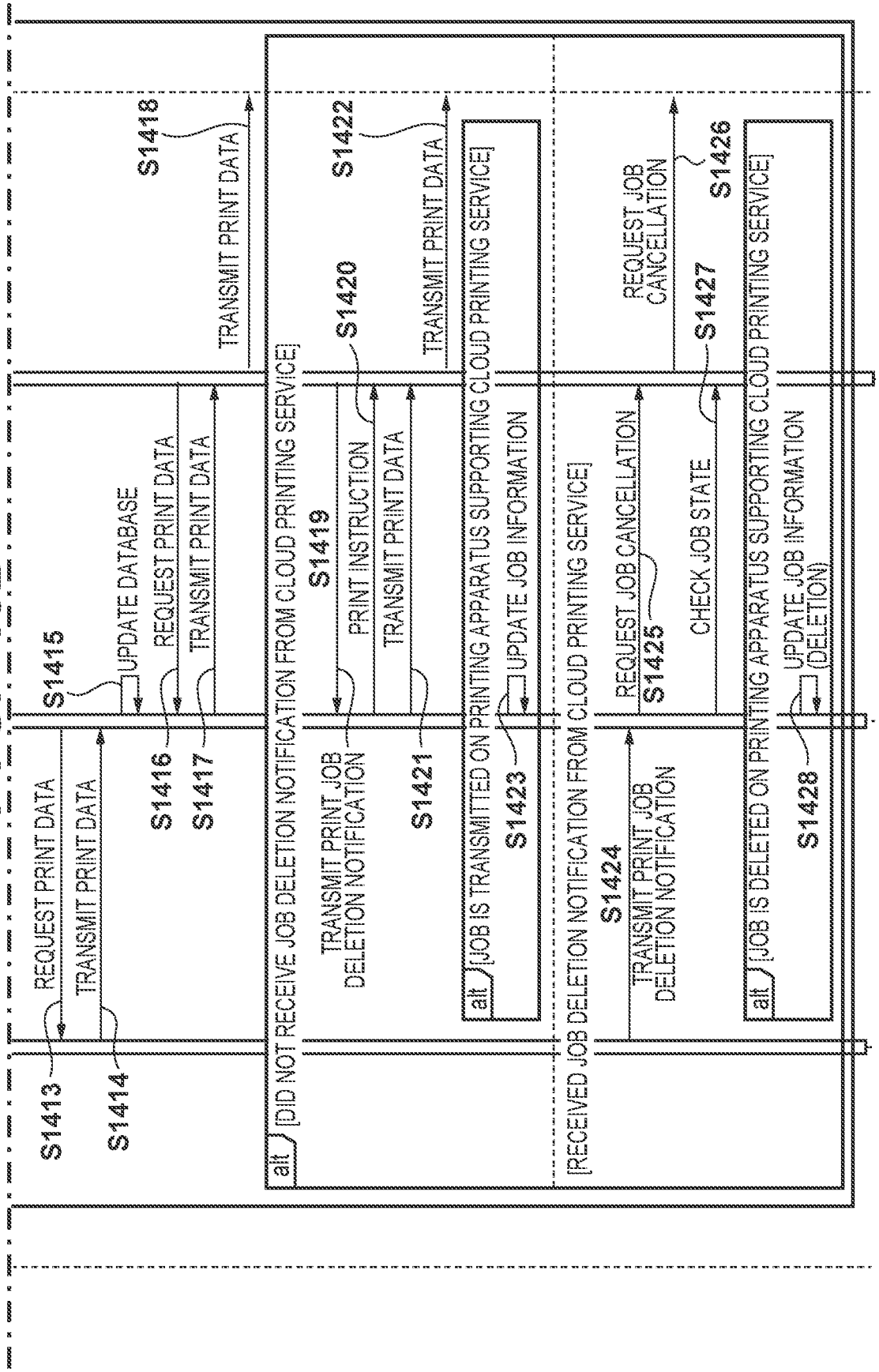

FIGS. 13A and 13B are sequence charts showing an example of a printing process executed by the cloud printing system according to this embodiment. S1401 to S1418 of FIGS. 13A and 13B are the same as in the description concerning S601 to S618 of FIGS. 6A and 6B. After print data is transmitted in S1418, a job storage period cooperation process (S1419 to S1428) is executed by the cloud printing mediation service 130.

First, a case will be described in which the cloud printing mediation service 130 has received a print job deletion notification from the PA cloud printing service 140, but has not received a print job deletion notification from the cloud printing service 120. In this case, the cloud printing mediation service 130 executes a resubmission process of the job (S1420, S1421, S1422, and S1423).

In S1419, the cloud printing mediation service 130 receives the print job deletion notification from the PA cloud printing service 140. Note that the print job deletion notification includes the identification information of the print job serving as a deletion target. The identification information is, for example, information included in a print job information table 152. At this time, if no print job deletion information has been received from the cloud printing service 120, in S1420, the cloud printing mediation service 130 transmits a printing instruction to the PA cloud printing service 140 as in S611 of FIGS. 6A and 6B. Then, in S1421, the cloud printing mediation service 130 transmits the print data to the PA cloud printing service 140 as in S617 of FIGS. 6A and 6B. The PA cloud printing service 140 having received the print data transmits the print data to a printing apparatus 110 as in S618 of FIGS. 6A and 6B. By the processing in S1420 and the processing in S1421, the PA cloud printing service 140 can start to store the print job resubmitted from the cloud printing mediation service 130. After a predetermined time has elapsed since S1421, the cloud printing mediation service 130 updates a print job transmission time 172 in the print job information table 152 in S1423.

In this manner, according to this embodiment, if a print job deletion notification has been received from the lower level service but no print job deletion notification has been received from the higher level service, the print job is resubmitted to the lower level service. With this, the lower level service can newly start the storage period, and it is possible to make the print job storage periods cooperate with each other while using the storage period of the higher level service as the reference.

Next, a case will be described in which the cloud printing mediation service 130 has received a print job deletion notification from the cloud printing service 120, but has not received a print job deletion notification from the PA cloud printing service 140. In this case, the cloud printing mediation service 130 executes a cancellation process of the job (S1425, S1426, S1427, and S1428).

In S1424, the cloud printing mediation service 130 receives the print job deletion notification from the cloud printing service 120. Note that the print job deletion notification includes the identification information of the print job serving as a deletion target. The identification information is, for example, information included in the print job information table 152. If no print job deletion notification has been received from the PA cloud printing service 140, the cloud printing mediation service 130 transmits a job cancellation request to the PA cloud printing service 140 in S1425. The cancellation request transmitted to the PA cloud printing service 140 corresponds to the print job deletion notification received in S1424. The PA cloud printing service 140 having received the cancellation request transmits a job cancellation request to the printing apparatus 110. Note that the cancellation request includes information in the print job information table 152. After confirming that the print job has been deleted in the PA cloud printing service 140, the cloud printing mediation service 130 deletes the information of the corresponding job in the print job information table 152 in S1428.

In this manner, according to this embodiment, if a print job deletion notification has been received from the higher level service but no print job deletion notification has been received from the lower level service, the lower level service is requested to cancel the print job. With this, it is possible to make the print job storage periods cooperate with each other while using the storage period of the printing higher level service as the reference.

Fifth Embodiment

The fifth embodiment will be described below with respect to points different from the first to fourth embodiments. In the fourth embodiment, the process has been described in which the job storage period of the higher level service is used as the reference to make the job storage periods cooperate between the higher level service and the lower level service. In this embodiment, a process will be described in which the job storage period of the lower level service is used as the reference to make the job storage periods cooperate with each other.

FIGS. 14A and 14B are sequence charts showing an example of a printing process executed by the cloud printing system according to this embodiment. S1501 to S1518 of FIGS. 14A and 14B are the same as in the description concerning S601 to S618 of FIGS. 6A and 6B. After print data is transmitted in S1518, a job storage period cooperation process (S1519 to S1526) is executed in a cloud printing mediation service 130.

First, a case will be described in which the cloud printing mediation service 130 has received a print job deletion notification from a cloud printing service 120, but has not received a print job deletion notification from a PA cloud printing service 140. In this case, the cloud printing mediation service 130 executes a resubmission process of the job (S1519, S1520, S1521, and S1522).

In S1519, the cloud printing mediation service 130 receives the print job deletion notification from the cloud printing service 120. Note that the print job deletion notification includes the identification information of the print job serving as a deletion target. The identification information is, for example, information included in a print job information table 152. At this time, if no print job deletion information has been received from the PA cloud printing service 140, in S1520, the cloud printing mediation service 130 submits the print job to a logical printing apparatus 121 registered on the cloud printing service 120. Then, in S1521, the cloud printing mediation service 130 transmits the print data acquired in S1514 to the cloud printing service 120. By the processing in S1520 and the processing in S1521, the cloud printing service 120 can start to store the print job resubmitted from the cloud printing mediation service 130. Note that the resubmitted print job includes information received in S1507 and stored in a database 150. After S1521, the cloud printing mediation service 130 updates a print job acceptance time 168 in the print job information table 152 in S1522.

In this manner, according to this embodiment, if a print job deletion notification has been received from the higher level service but no print job deletion notification has been received from the lower level service, the print job is resubmitted to the higher level service. With this, the higher level service can newly start the storage period, and it is possible to make the print job storage periods cooperate with each other while using the storage period of the lower level service as the reference.

Next, a case will be described in which the cloud printing mediation service 130 has received a print job deletion notification from the PA cloud printing service 140, but has not received a print job deletion notification from the cloud printing service 120. In this case, the cloud printing mediation service 130 executes a cancellation process of the job (S1524, S1525, and S1526).

In S1523, the cloud printing mediation service 130 receives the print job deletion notification from the PA cloud printing service 140. Note that the print job deletion notification includes the identification information of the print job serving as a deletion target. The identification information is, for example, information included in the print job information table 152. At this time, if no print job deletion notification has been received from the cloud printing service 120, the cloud printing mediation service 130 transmits a print job cancellation request to the cloud printing service 120 in S1524. Then, the cloud printing mediation service 130 checks the job state in the PA cloud printing service 140. The cancellation request transmitted to the cloud printing service 120 corresponds to the print job deletion notification received in S1523. Note that the cancellation request includes information in the print job information table 152. After confirming that the print job has been deleted in the cloud printing service 140, the cloud printing mediation service 130 deletes the information of the corresponding print job in the print job information table 152 in S1526.

In this manner, according to this embodiment, if a print job deletion notification has been received from the lower level service but no print job deletion notification has been received from the higher level service, the higher level service is requested to cancel the print job. With this, it is possible to make the print job storage periods cooperate with each other while using the storage period of the lower level service as the reference.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-024021, filed Feb. 18, 2022, which is hereby incorporated by reference herein in its entirety.

What is claimed is:

1. A server that can provide a cloud mediation service capable of cooperating with a plurality of cloud services, wherein
    the plurality of cloud services include a first cloud service to which a job is submitted, and a second cloud service that executes an output process corresponding to the job,
    in the cloud mediation service, the server comprises
    a submission unit configured to submit a first job submitted to the first cloud service to the second cloud service as a second job,
    an acquisition unit configured to acquire a first storage period for storing, in the first cloud service, the first job submitted to the first cloud service, and a second storage period for storing, in the second cloud service, the second job submitted to the second cloud service, and
    an execution unit configured to execute, based on one of a first timing at which the first job is deleted due to an elapse of the first storage period and a second timing at which the second job is deleted due to an elapse of the second storage period, a cooperation process of making a period for storing the first job in the first cloud service and a period for storing the second job in the second cloud service cooperate with each other, and
    the cooperation process includes a process of restarting storage for one of the first storage period and the second storage period, and a process of interrupting storage for one of the first storage period and the second storage period.

2. The server according to claim 1, wherein
if the second timing is earlier than the first timing, the execution unit submits a job corresponding to the second job to the second cloud service based on the second timing, thereby restarting storage for the second storage period.

3. The server according to claim 2, wherein
if the second timing is later than the first timing, the execution unit requests the second cloud service to cancel the second job based on the first timing, thereby interrupting storage for the second storage period.

4. The server according to claim 1, wherein
if the second timing is later than the first timing, the execution unit submits a job corresponding to the first job to the first cloud service based on the first timing, thereby restarting storage for the first storage period.

5. The server according to claim 4, wherein
if the second timing is earlier than the first timing, the execution unit requests the first cloud service to cancel the first job based on the second timing, thereby interrupting storage for the first storage period.

6. The server according to claim 1, further comprising
a second acquisition unit configured to acquire first time at which the first job has been submitted to the first cloud service, and second time at which the second job has been submitted to the second cloud service,
wherein the execution unit recognizes the first timing by comparing time obtained from the first time and the first storage period with a current time, and recognizes the second timing by comparing time obtained from the second time and the second storage period with the current time.

7. The server according to claim 1, further comprising
a reception unit configured to receive a deletion notification of the first job transmitted from the first cloud service, and a deletion notification of the second job transmitted from the second cloud service,
wherein the execution unit recognizes the first timing by receiving the deletion notification of the first job by the reception unit, and recognizes the second timing by receiving the deletion notification of the second job by the reception unit.

8. The server according to claim 7, wherein
if the reception unit has received the deletion notification of the first job but has not received the deletion notification of the second job, the execution unit recognizes the first timing by reception of the deletion notification of the first job.

9. The server according to claim 7, wherein
if the reception unit has received the deletion notification of the second job but has not received the deletion notification of the first job, the execution unit recognizes the second timing by reception of the deletion notification of the second job.

10. The server according to claim 1, further comprising:
a second reception unit configured to receive, from the second cloud service, a completion notification indicating that the output process is complete;
an estimation unit configured to estimate time at which the output process is complete; and
a transmission unit configured to transmit a notification indicating a possibility of an error if the second reception unit does not receive the completion notification even though the time estimated by the estimation unit has elapsed.

11. The server according to claim 10, wherein
the transmission unit transmits the notification indicating the possibility of the error to the first cloud service.

12. The server according to claim 10, wherein
the transmission unit transmits the notification indicating the possibility of the error to an information processing apparatus corresponding to the first job.

13. The server according to claim 1, wherein
the job is a print job, and
the output process is a process of causing a printing apparatus associated with the second cloud service to execute printing.

14. A method comprising:
in a cloud mediation service capable of cooperating with a plurality of cloud services including a first cloud service to which a job is submitted, and a second cloud service that executes an output process corresponding to the job,
submitting a first job submitted to the first cloud service to the second cloud service as a second job;
acquiring a first storage period for storing, in the first cloud service, the first job submitted to the first cloud service, and a second storage period for storing, in the second cloud service, the second job submitted to the second cloud service; and
executing, based on one of a first timing at which the first job is deleted due to an elapse of the first storage period and a second timing at which the second job is deleted due to an elapse of the second storage period, a cooperation process of making a period for storing the first job in the first cloud service and a period for storing the second job in the second cloud service cooperate with each other,
wherein the cooperation process includes a process of restarting storage for one of the first storage period and the second storage period, and a process of interrupting storage for one of the first storage period and the second storage period.

15. A non-transitory computer-readable storage medium storing a program configured to cause a computer to function to:
in a cloud mediation service capable of cooperating with a plurality of cloud services including a first cloud service to which a job is submitted, and a second cloud service that executes an output process corresponding to the job,
submit a first job submitted to the first cloud service to the second cloud service as a second job;
acquire a first storage period for storing, in the first cloud service, the first job submitted to the first cloud service, and a second storage period for storing, in the second cloud service, the second job submitted to the second cloud service; and
execute, based on one of a first timing at which the first job is deleted due to an elapse of the first storage period and a second timing at which the second job is deleted due to an elapse of the second storage period, a cooperation process of making a period for storing the first job in the first cloud service and a period for storing the second job in the second cloud service cooperate with each other,
wherein the cooperation process includes a process of restarting storage for one of the first storage period and the second storage period, and a process of interrupting storage for one of the first storage period and the second storage period.

* * * * *